United States Patent
Inukai et al.

(10) Patent No.: US 11,619,811 B2
(45) Date of Patent: Apr. 4, 2023

(54) IMAGE DISPLAY SYSTEM, MOVING BODY, IMAGE DISPLAY METHOD, AND PROGRAM

(71) Applicant: Panasonic Intellectual Property Management Co., Ltd., Osaka (JP)

(72) Inventors: Fumihito Inukai, Kyoto (JP); Toshiya Mori, Osaka (JP); Masanaga Tsuji, Osaka (JP); Ken'ichi Kasazumi, Osaka (JP); Yukihiro Chokyu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/484,905

(22) Filed: Sep. 24, 2021

(65) Prior Publication Data

US 2022/0011574 A1    Jan. 13, 2022

Related U.S. Application Data

(63) Continuation of application No. PCT/JP2020/007099, filed on Feb. 21, 2020.

(30) Foreign Application Priority Data

Mar. 26, 2019  (JP) .............................. JP2019-059194
Mar. 26, 2019  (JP) .............................. JP2019-059468

(51) Int. Cl.
 *G02B 27/01*   (2006.01)
 *B60W 40/10*   (2012.01)
 *G09G 5/38*   (2006.01)

(52) U.S. Cl.
 CPC .......... *G02B 27/0101* (2013.01); *B60W 40/10* (2013.01); *G02B 27/0179* (2013.01); *G09G 5/38* (2013.01); *G02B 2027/0183* (2013.01)

(58) Field of Classification Search
 CPC ............ G02B 27/0101; G02B 27/0179; G02B 2027/0183; G02B 2027/014; B60W 40/10;
(Continued)

(56) References Cited

U.S. PATENT DOCUMENTS

2010/0164702 A1*  7/2010  Sasaki ..................... G01B 21/22
                                                                345/7
2011/0134498 A1*  6/2011  Ohta ................... G02B 26/0816
                                                                359/200.7
(Continued)

FOREIGN PATENT DOCUMENTS

EP        2724889       4/2014
JP        01-293239     11/1989
(Continued)

OTHER PUBLICATIONS

International Search Report (ISR) from International Searching Authority (Japan Patent Office) in International Pat. Appl. No. PCT/JP2020/007099, dated May 19, 2020, together with an English language translation.
Office Action issued in Japanese Counterpart Patent Appl. No. 2019-059194, dated Sep. 20, 2020, along with an English translation thereof.

*Primary Examiner* — Brent D Castiaux
(74) *Attorney, Agent, or Firm* — Greenblum & Bernstein, P.L.C.

(57) ABSTRACT

An image display system includes: an image projection unit that projects and displays an image on a display target for a moving body; a posture angle calculation unit that calculates a posture angle for the moving body on the basis of chronological data for acceleration detection values for the acceleration of the moving body in a prescribed time period; and a display control unit that controls the display position at which the image is projected and displayed on the display
(Continued)

target, in accordance with the posture angle calculated by the posture angle calculation unit. The acceleration detection values include bi-directional components. The posture angle calculation unit excludes acceleration detection values from the chronological data used when calculating the posture angle, said acceleration detection values being included in an exclusion time period which has a ratio for the bidirectional components, in the prescribed time period, that is outside a prescribed range.

20 Claims, 18 Drawing Sheets

(58) Field of Classification Search
CPC ............ G09G 5/38; G09G 5/00; B60K 35/00; B60Q 1/00; B60Q 1/04; B60R 11/02
See application file for complete search history.

(56) References Cited

U.S. PATENT DOCUMENTS

| | | | |
|---|---|---|---|
| 2019/0139286 A1* | 5/2019 | Shimoda | G08G 1/0962 |
| 2020/0012103 A1 | 1/2020 | Kasazumi et al. | |
| 2020/0096776 A1 | 3/2020 | Hayashi et al. | |

FOREIGN PATENT DOCUMENTS

| | | |
|---|---|---|
| JP | 2018-047911 | 3/2018 |
| WO | 2018/179724 | 10/2018 |
| WO | 2018/203371 A1 | 11/2018 |

\* cited by examiner

IMAGE DISPLAY SYSTEM, MOVING BODY, IMAGE DISPLAY METHOD, AND PROGRAM

TECHNICAL FIELD

The present disclosure relates to an image display system, a moving body, an image display method and a program. More specifically, the present disclosure relates to an image display system that displays an image by projecting the image to a display object, a moving body including the image display system, an image display method and a program.

BACKGROUND ART

PTL 1 discloses a head-up display device mounted on a vehicle. This head-up display device displays information from an image display unit by projecting it onto the front shield of a vehicle. As a result, the information from the image display unit is superimposed in the field of view of the observer. This head-up display device calculates the attitude angle of the vehicle by detecting the acceleration of the vehicle (moving object) described above, and corrects the display position of the superimposed image according to the attitude angle.

CITATION LIST

Patent Literature

PTL 1
Japanese Patent Application Laid-Open No. H1-293239

SUMMARY OF INVENTION

Technical Problem

However, the acceleration of a vehicle may fluctuate significantly due to the disturbances that the vehicle is subjected to while driving. Therefore, the attitude angle of the vehicle cannot be calculated accurately. Therefore, the information from the image display unit cannot be accurately corrected according to the attitude angle of the vehicle.

The present disclosure provides an image display system, a moving body, an image display method and a program that can accurately calculate the attitude angle of a moving body.

Solution to Problem

An image display system according to an aspect of the present disclosure is configured to be mounted in a moving body, the image display system including: an image projection part configured to display an image by projecting the image to a display object of the moving body; an attitude angle calculation section configured to calculate an attitude angle of the moving body on a basis of time-series data of an acceleration detection value of an acceleration of the moving body in a predetermined period; and a display control section configured to control a position where the image is displayed and projected at the display object in accordance with the attitude angle calculated by the attitude angle calculation section. The acceleration detection value includes components of two directions. The attitude angle calculation section excludes the acceleration detection value included in an exclusion period in which a ratio of the components of two directions is outside a predetermined range in the predetermined period, from the time-series data used for calculation of the attitude angle.

An image display system according to an aspect of the present disclosure is configured to be mounted in a moving body, the image display system including: an image projection part configured to display an image by projecting the image to a display object of the moving body; an attitude angle calculation section configured to calculate an attitude angle of the moving body on a basis of time-series data of an acceleration detection value of an acceleration of the moving body in a predetermined period; and a display control section configured to control a position where the image is displayed and projected at the display object in accordance with the attitude angle calculated by the attitude angle calculation section. The attitude angle calculation section excludes the acceleration detection value included in an exclusion period in which an angular velocity detection value of an angular velocity of the moving body is outside a predetermined range, from the time-series data used for calculation of the attitude angle.

A moving body according to an aspect of the present disclosure includes: the above-mentioned image display system; and a moving body main body in which the image display system is mounted. The display object is a windshield of the moving body main body.

An image display method according to an aspect of the present disclosure is a method of controlling an image display system configured to be mounted in a moving body, the method including: an image projection process of displaying an image by projecting the image to a display object of the moving body; an attitude angle calculation process of calculating an attitude angle of the moving body on a basis of time-series data of an acceleration detection value of an acceleration of the moving body in a predetermined period; and a display control process of controlling a position where the image is displayed and projected at the display object in accordance with the attitude angle calculated by the attitude angle calculation process. The acceleration detection value includes components of two directions. The attitude angle calculation process excludes the acceleration detection value included in an exclusion period in which a ratio of the components of two directions is outside a predetermined range in the predetermined period, from the time-series data used for calculation of the attitude angle.

An image display method according to an aspect of the present disclosure is a method of controlling an image display system configured to be mounted in a moving body, the method including: an image projection process of displaying an image by projecting the image to a display object of the moving body; an attitude angle calculation process of calculating an attitude angle of the moving body on a basis of time-series data of an acceleration detection value of an acceleration of the moving body in a predetermined period; and a display control process of controlling a position where the image is displayed and projected at the display object in accordance with the attitude angle calculated by the attitude angle calculation process. The attitude angle calculation process excludes the acceleration detection value included in an exclusion period in which an angular velocity detection value of an angular velocity of the moving body is outside a predetermined range, from the time-series data used for calculation of the attitude angle.

A program according to an aspect of the present disclosure is configured to cause a computer system to execute the above-mentioned image display method.

Advantageous Effects of Invention

The present disclosure provides an effect of more accurately calculating the attitude angle of the image projection part.

DESCRIPTION OF EMBODIMENTS

Embodiment 1

Overview

Figure 1:
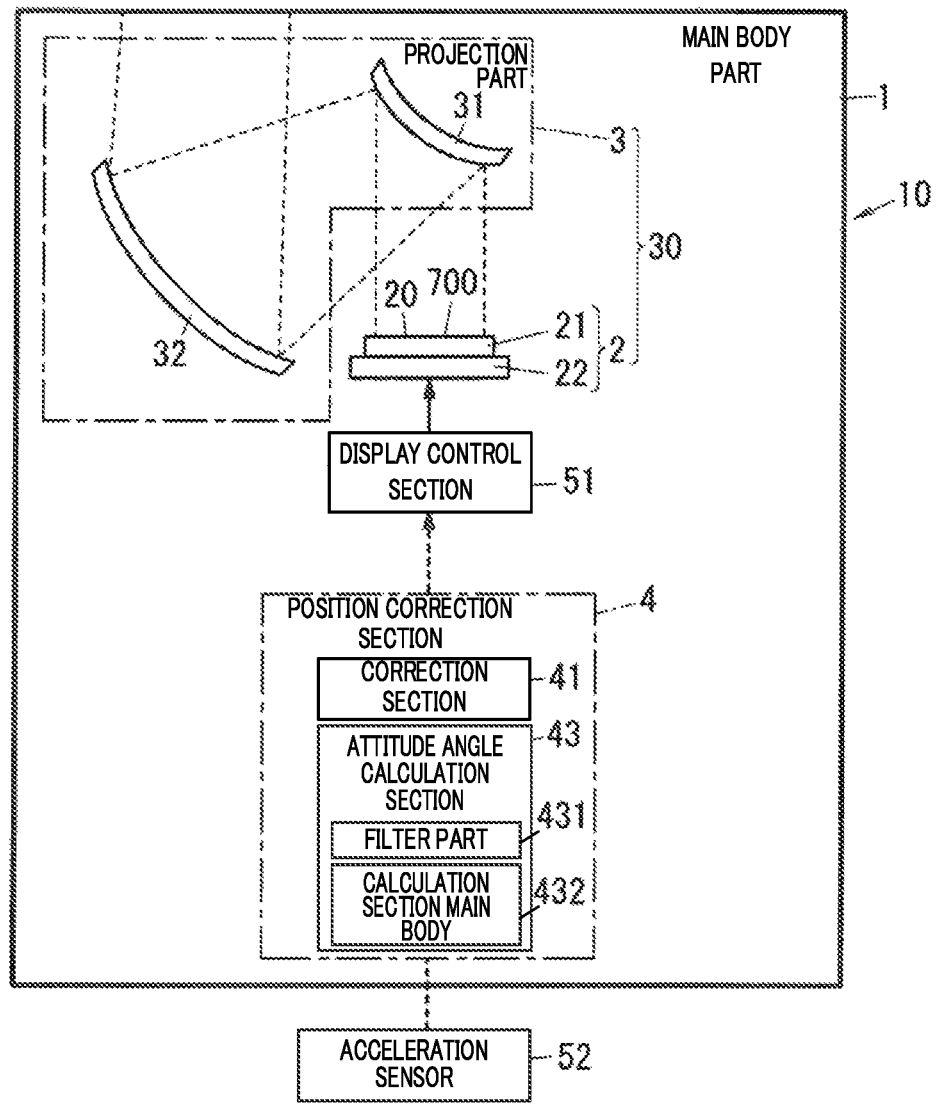
FIG. 1 is a conceptual view illustrating a configuration of an image display system according to Embodiment 1.
Figure 2:
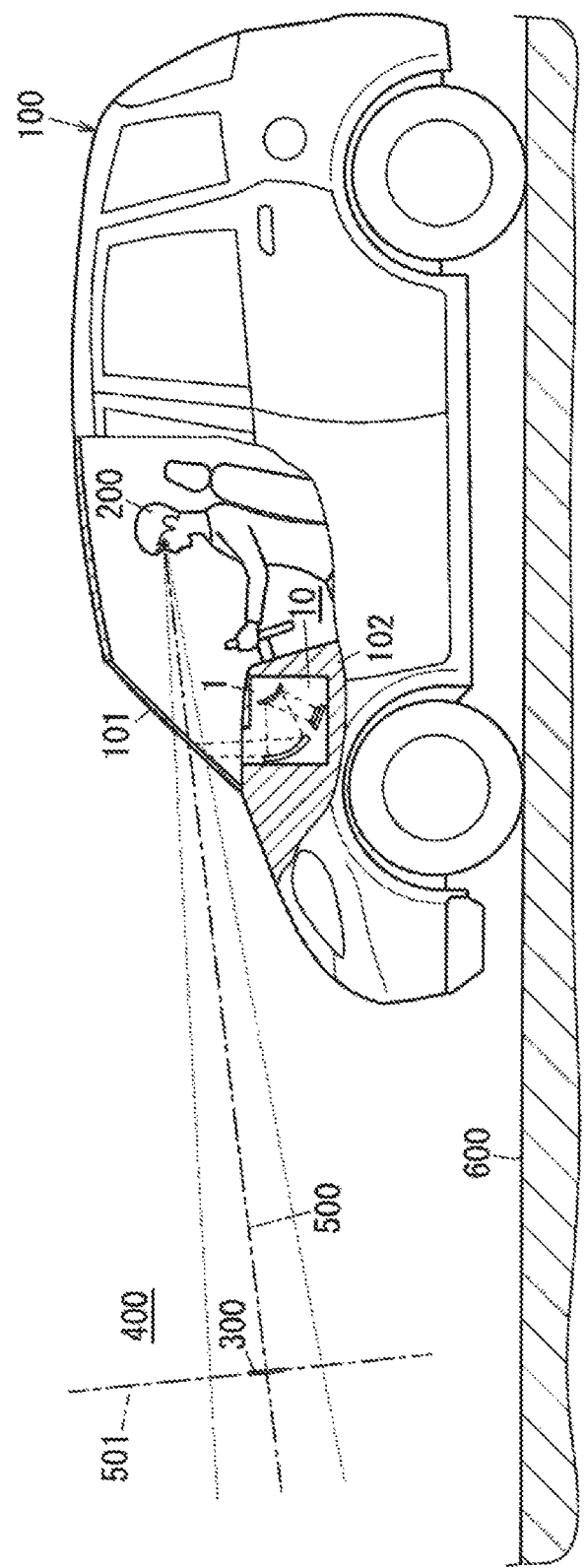
FIG. 2 is a conceptual view of an automobile including the image display system.

As illustrated in FIG. 1 and FIG. 2, for example, image display system 10 according to the present embodiment is a head-up display (HUD) provided in automobile 100 as a moving body. Specifically, moving body 100 includes a moving body main body, and image display system 10 provided in the moving body main body.

This image display system 10 is installed in the interior of automobile 100 so as to project an image to front shield 101 (windshield) of automobile 100 from below. In the example illustrated in FIG. 2, image display system 10 is disposed in dashboard 102 below front shield 101. When an image is projected to front shield 101 from image display system 10, the image displayed on front shield 101 as a display object is visually recognized by user 200 (driver).

Figure 3:
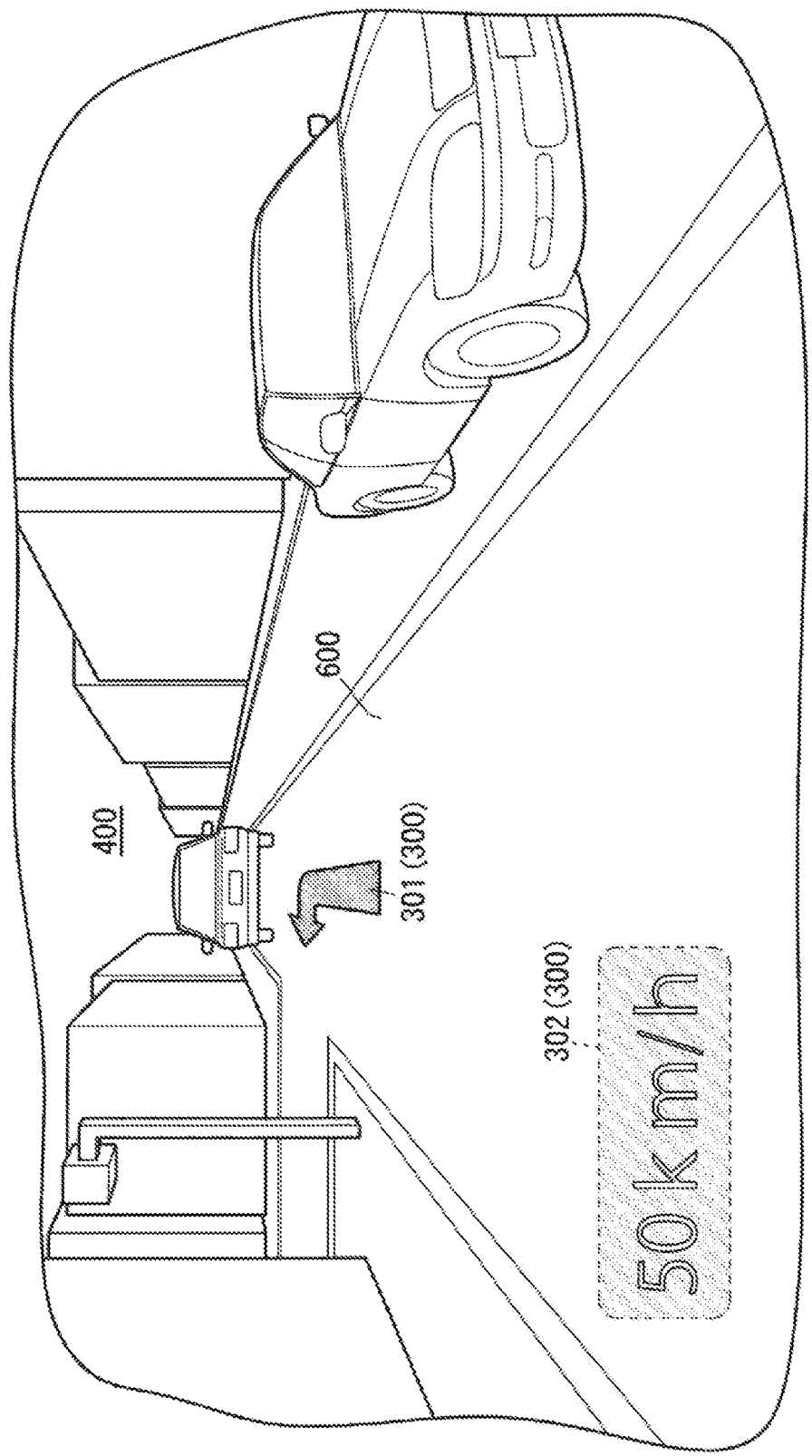
FIG. 3 is a conceptual view illustrating the field of view of a user of a case where the image display system is used.

With this image display system 10, user 200 visually recognizes virtual image 300 projected in object space 400 set in front of automobile 100 (outside the vehicle) through front shield 101. Here, "virtual image" means an image that is formed like an actual object with divergent light beams of light emitted from image display system 10 diverging at a display object such as front shield 101. Thus, as illustrated in FIG. 3, the user 200 driving automobile 100 can see virtual image 300 projected by image display system 10 in a superimposed manner on the real space spreading in front of automobile 100. Thus, with image display system 10, for example, it is possible to display various drive assisting information such as vehicle speed information, navigation information, pedestrian information, forward vehicle information, lane deviation information, and vehicle condition information, as virtual image 300 to be visually recognized by user 200. In this manner, user 200 can visually acquire the drive assisting information by only slightly moving the line of sight from the state where user 200 is directing the line of sight toward the front side of front shield 101.

In image display system 10 according to the present embodiment, virtual image 300 formed in object space 400 includes at least virtual images of two types, first virtual image 301 and second virtual image 302. Here, the "first virtual image" is, for example, information representing a travelling direction of automobile 100 as navigation information, and can, for example, present arrows indicating right turn or left turn on road surface 600. First virtual image 301 of this type is an image that is displayed using an augmented reality (AR) technique, and is displayed in a superimposed manner at a specific position in the real scenery (such as road surface 600, the building, the region around vehicle, and the pedestrian) as viewed from user 200. Second virtual image 302 is, for example, vehicle speed information, and can, for example, present a current travelling speed (vehicle speed) of automobile 100. In the example illustrated in FIG. 3, first virtual image 301 represents an arrow indicating "left turn" on a T-junction in front of automobile 100 as an example. Second virtual image 302 represents information "50 km/h" as an example.

In image display system 10, virtual image 300 formed in object space 400 is formed on virtual plane 501 that intersects optical axis 500 of image display system 10. In the present embodiment, optical axis 500 extends along road surface 600 in front of automobile 100 in object space 400 in front of automobile 100. Further, virtual plane 501 where virtual image 300 is formed is approximately perpendicular to road surface 600. For example, in the case where road surface 600 is a horizontal surface, virtual image 300 is displayed along the vertical surface.

In this case, image display system 10 according to the present embodiment includes image projection part 30 and main body part 1.

Image projection part 30 forms image 700 and projects and displays the formed image 700 on front shield 101 to thereby project virtual image 300 corresponding to image 700 in object space 400. Image projection part 30 includes image forming part 2 and projection part 3.

Image forming part 2 includes display surface 20, and forms image 700 on display surface 20 (see FIG. 8). Image forming part 2 projects the formed image on projection part 3 using output light. Projection part 3 projects, to front shield 101, the image projected from image forming part 2 to thereby project virtual image 300 corresponding to image 700 in object space 400.

The above-described image forming part 2 and projection part 3 are mounted in main body part 1. In the state where this main body part 1 is mounted in automobile 100, the attitude of main body part 1 changes together with the attitude of automobile 100 due to the load of automobile 100, for example. Note that since image projection part 30 is mounted in main body part 1, the attitude of image projection part 30 is the same as the attitude of main body part 1. Therefore, the attitude of main body part 1 is also the attitude of image projection part 30.

To be more specific, for example, when automobile 100 is tilted forward such as when passengers are in the driver's seat and the front passenger seat, main body part 1 is also tilted forward; whereas when it is tilted rearward such as when a passenger is in the rear seat or when a load is put in the trunk, main body part 1 is also tilted rearward. When the attitude of main body part 1 of image display system 10 (i.e., the attitude angle of image projection part 30) changes, the position of virtual image 300 projected by this image display system 10 in object space 400 also changes. As such, in the case of first virtual image 301, for example, when automobile 100 is tilted forward or tilted rearward, it may be displayed in a superimposed manner at a position shifted from the specific position where it should be originally superimposed in the real scenery as viewed from user 200.

In view of this, image display system 10 according to the present embodiment further includes position correction section 4 for correcting the display position of virtual image 300. Position correction section 4 changes the display position of virtual image 300 relative to main body part 1 (i.e., moving body 100) on the basis of the attitude angle of main body part 1 (i.e., the attitude angle of moving body 100). The attitude angle of main body part 1 is, for example, the inclination of the vertical axis of main body part 1 with respect to the vertical axis orthogonal to the road surface.

In this manner, the display position of virtual image 300 is adjusted by adjusting the display position of image 700 at front shield 101 in accordance with the attitude angle of main body part 1. Therefore, in the case of first virtual image 301, for example, image display system 10 can display it in a superimposed manner at the specific position where it should be originally superimposed in the real scenery as viewed from user 200 even when automobile 100 is tilted forward or tilted rearward.

Configuration

As illustrated in FIG. 1, image display system 10 according to the present embodiment includes main body part 1, image projection part 30, position correction section 4, display control section 51, and acceleration sensor 52. Image projection part 30 includes image forming part 2 and projection part 3.

Main body part 1 is composed of one housing, for example. When image forming part 2 and projection part 3 are housed in main body part 1, image forming part 2 and projection part 3 are mounted in main body part 1. In the present embodiment, the components (position correction section 4 and display control section 51) other than image forming part 2 and projection part 3 are also mounted (housed) in main body part 1. Main body part 1 is fixed in dashboard 102 of automobile 100. It should be noted that the components (position correction section 4 and display control section 51) other than image forming part 2 and projection part 3 may not be mounted in main body part 1. In addition, main body part 1 may be composed of a plurality of housings. Alternatively, main body part 1 may not be a housing in the first place, and may be, for example, a frame, a plate member or the like.

Image projection part 30 forms image 700 and projects and displays the formed image 700 on front shield 101 to thereby project virtual image 300 corresponding to image 700 in object space 400.

Image forming part 2 includes display surface 20, and forms image 700 on display surface 20. In the present embodiment, as an example, image forming part 2 includes liquid crystal panel 21 (LCD) and light source apparatus 22 as illustrated in FIG. 1. Liquid crystal panel 21 is disposed in front of light source apparatus 22. The front surface of liquid crystal panel 21 (the surface on the side opposite to light source apparatus 22) constitutes display surface 20. Light source apparatus 22 is used as a backlight of liquid crystal panel 21. Light from light source apparatus 22 is transmitted through liquid crystal panel 21 from the rear side of liquid crystal panel 21 and output from image forming part 2. Light source apparatus 22 is a planar light source that irradiates substantially the entire back surface of liquid crystal panel 21 with light using a solid light-emitting element such as a light-emitting diode, a laser diode or the like.

In this image forming part 2, when light source apparatus 22 emits light in the state where image 700 is displayed at liquid crystal panel 21, light output forward from light source apparatus 22 is transmitted through liquid crystal panel 21 and output forward from the front surface (display surface 20) of liquid crystal panel 21. At this time the light output forward from display surface 20 is light (image light) reflective of image 700 displayed on liquid crystal panel 21. Accordingly, when display surface 20 is viewed from the front side, image 700 appears to be displayed on display surface 20, and thus image 700 is formed on display surface 20.

Note that while image forming part 2 includes liquid crystal panel 201, such a configuration is not limitative. For example, image forming part 2 may be configured to form image 700 by scanning laser light from the back surface of display surface 20 of image forming part 2.

Here, the vertical direction of display surface 20 corresponds to the vertical direction of image 700, and the lateral direction of display surface 20 corresponds to the lateral direction of image 700. The vertical direction of projected image 700 is a direction along the vertical direction of virtual image 300 (see FIG. 2) projected in object space 400 (see FIG. 2), i.e., the vertical direction in the field of view of user 200 (see FIG. 2). The lateral direction of projected image 700 is a direction along the lateral direction of virtual image 300 projected in object space 400, i.e., the horizontal direction in the field of view of user 200.

Projection part 3 projects and displays image 700 on front shield 101 using output light of image forming part 2 to thereby project virtual image 300 corresponding to image 700 in object space 400.

As illustrated in FIG. 1, projection part 3 includes first mirror 31 and second mirror 32. First mirror 31 and second mirror 32 are disposed in the order of first mirror 31 and second mirror 32 on the light path of output light from image forming part 2. More specifically, first mirror 31 is disposed in front of display surface 20 of image forming part 2 such that output light of image forming part 2 impinges on it. First mirror 31 reflects output light of image forming part 2 toward second mirror 32. Second mirror 32 is disposed at a position (e.g., a position on the front lower side of first mirror 31) where the output light of image forming part 2 reflected by first mirror 31 impinges. Second mirror 32 reflects upward (i.e., front shield 101) the output light of image forming part 2 reflected by first mirror 31. First mirror 31 is, for example, a convex mirror, and second mirror 32 is, for example, a concave mirror.

With this configuration, projection part 3 enlarges or reduces image 700 displayed on display surface 20 of image forming part 2 into an appropriate size, and projects it on front shield 101 as an projection image. As a result, virtual image 300 is displayed in object space 400. Specifically, in the field of view of the user 200 driving automobile 100, virtual image 300 of image 700 projected from image display system 10 is displayed in a superimposed manner on the real scene spreading in front of automobile 100.

Display control section 51 controls image forming part 2. Display control section 51 is composed of a microcomputer with a central processing unit (CPU) and a memory as main components, for example. In other words, display control section 51 is implemented as a computer including a CPU and a memory, and the computer functions as display control section 51 when the CPU executes a program stored in the memory. Here, the program is recorded in advance in the memory of display control section 51, but may be provided using a telecommunication line such as the Internet, or a recording medium such as a memory card in which it is recorded.

Display control section 51 forms given image 700 on display surface 20 by controlling image forming part 2. In addition, display control section 51 controls the display position of image 700 at display surface 20. In this manner, display control section 51 controls the display position of image 700 at front shield 101. As a result, the display position of virtual image 300 projected in object space 400 relative to main body part 1 can be controlled.

Through a software process, display control section 51 can display (draw) a given image content on liquid crystal panel 21. In this manner, given image 700 is formed on display surface 20 and the display position of image 700 at display surface 20 is controlled. For example, when virtual image 300 (first virtual image 301 and second virtual image 302) as illustrated in FIG. 3 is projected in object space 400, the content of first virtual image 301 (such as the attitude and position of the arrow), and the content of second virtual image 302 (such as the vehicle speed) are determined at display control section 51. Further, display control section 51 also determines the position of image 700 at the front surface of liquid crystal panel 21, i.e., at display surface 20. When the position of image 700 at display surface 20 changes, the display position of virtual image 300 relative to main body part 1 also changes.

Acceleration sensor 52 detects the acceleration (in the present embodiment, motion acceleration) (detection value G) that acts on automobile 100. The motion acceleration is an acceleration that is generated at automobile 100 due to acceleration of travelling automobile 100. That is, the motion acceleration is the acceleration that acts on automobile 100, excluding the gravitational acceleration. The motion acceleration is generated in the direction opposite to the acceleration direction of automobile 100, for example.

Note that in the present embodiment, acceleration sensor 52 directly detects the motion acceleration that acts on automobile 100. It should be noted that in the case where acceleration sensor 52 detects the combined acceleration of the motion acceleration and gravitational acceleration of automobile 100, it is possible to use, as detection value G of the motion acceleration of automobile 100, a value obtained by dividing, in terms of vector, the value of the gravitational acceleration that acts on automobile 100 from the detection value of the combined acceleration. In this case, detection value G of acceleration sensor 52 in a stationary state may be used as the value of the gravitational acceleration that acts on automobile 100.

Figure 4A:
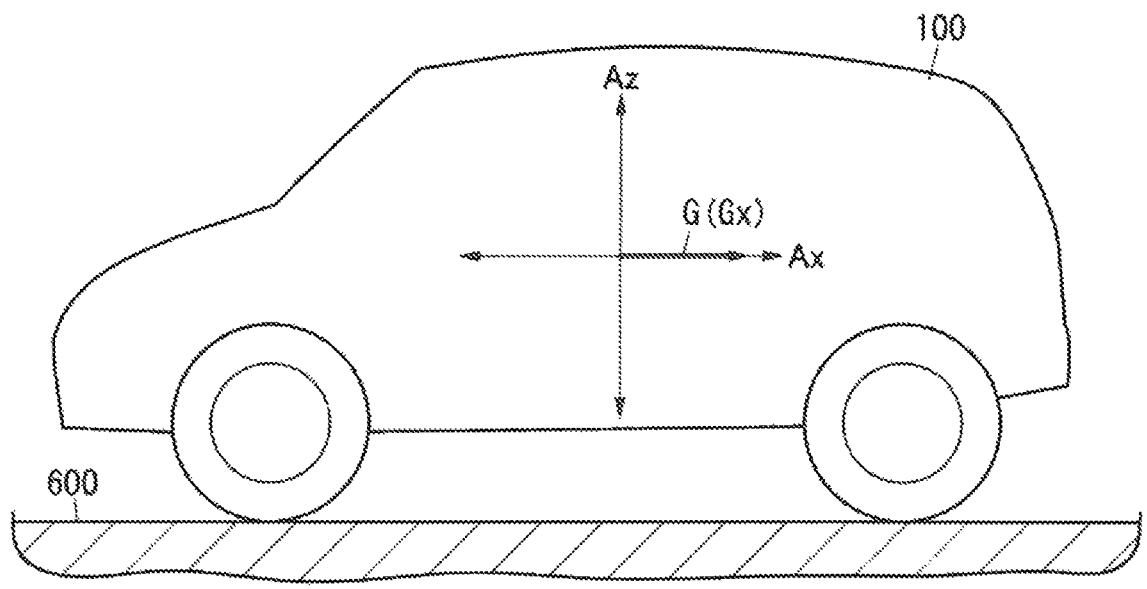
FIG. 4A is a diagram for describing a motion acceleration that acts on the automobile in the case where the automobile is not tilted.
Figure 4B:
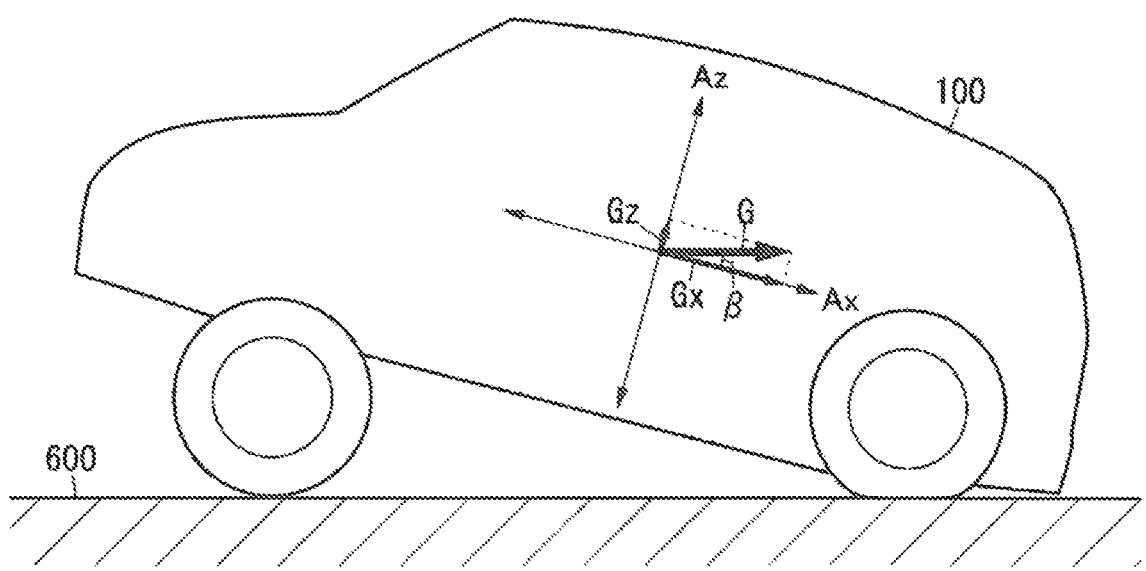
FIG. 4B is a diagram for describing a motion acceleration that acts on the automobile in the case where the automobile is tilted.

Acceleration sensor 52 is, for example, a biaxial acceleration sensor, and detects the acceleration in the vertical axis Az direction (vertical direction) and the front-rear axis AX direction (front-rear direction) of automobile 100. Note that the vertical axis Az and front-rear axis Ax are virtual axes fixed in automobile 100. The front-rear axis AX direction is orthogonal to the vertical axis Az direction. For example, in the case where the attitude of automobile 100 traveling forward is not tilted in the front-rear direction with respect to road surface 600, the motion acceleration that acts on automobile 100 acts only in the front-rear axis AX direction of automobile 100. In view of this, detection value G of acceleration sensor 52 (i.e., the detection value of the motion acceleration) has only acceleration component Gx in the front-rear axis AX direction (see FIG. 4A). On the other hand, in the case where the attitude of automobile 100 traveling forward is tilted in, for example, the front-rear direction with respect to road surface 600, the motion acceleration that acts on automobile 100 acts in both the vertical axis Az direction and the front-rear axis AX direction of automobile 100. As such, detection value G has acceleration component Gz in the vertical axis Az direction and acceleration component Gx in the front-rear axis AX direction (see FIG. 4B).

Position correction section 4 calculates the attitude (or more specifically, the attitude angle) of main body part 1 on the basis of detection value G of acceleration sensor 52, and changes the display position of image 700 at display surface 20 on the basis of the calculated attitude angle. In this manner, the display position of image 700 at front shield 101 changes. As a result, the display position of virtual image 300 relative to main body part 1 changes. In this manner, when the attitude of main body part 1 changes, image display system 10 changes the display position of image 700 at display surface 20 in accordance with the change, and thus image display system 10 can correct the display position of virtual image 300. For example, for first virtual image 301, it can be corrected at the specific position where it should be originally superimposed in the real scenery as viewed from user 200, and can be displayed in a superimposed manner.

Position correction section 4 is composed of a microcomputer mainly composed of a CPU and a memory, for example. At least some function (e.g., correction section 41) of position correction section 4 may share one microcomputer with display control section 51.

Position correction section 4 includes correction section 41 and attitude angle calculation section 43.

Attitude angle calculation section 43 calculates the attitude angle of main body part 1 on the basis of the time-series data of detection value G (acceleration detection value) of acceleration sensor 52. More specifically, attitude angle calculation section 43 calculates the attitude angle of automobile 100 on the basis of the time-series data of detection value G of acceleration sensor 52, and sets the calculated attitude angle as the attitude angle of main body part 1. Specifically, main body part 1 is fixed to dashboard 102 such that the upper-lower direction, front-rear direction and horizontal direction of main body part 1 coincide with the upper-lower direction, front-rear direction and horizontal direction of automobile 100. Thus, the attitude angle of main body part 1 coincides with the attitude angle of automobile 100 (vehicle body), and the attitude angle of main body part 1 can be calculated from the attitude angle of automobile 100. Note that the attitude angle is an inclination of the vertical axis Az of automobile 100 from the Earth's vertical line.

In the present embodiment, acceleration sensor 52 is a biaxial (the vertical axis Az and front-rear axis Ax biaxial) acceleration sensor. As such, detection value G of acceleration sensor 52 includes acceleration component Gz in the vertical axis Az direction (vertical direction) and acceleration component Gx in the front-rear axis AX direction (front-rear direction). Attitude angle calculation section 43 calculates arctan (Gz/Gx) as attitude angle $\beta$ (see FIG. 4).

On the basis of the attitude angle (i.e., the attitude angle of main body part 1) calculated by attitude angle calculation section 43, correction section 41 controls the display control section so as to change the display position of image 700 at display surface 20. Through this control, the display position of virtual image 300 relative to main body part 1 is corrected in accordance with the attitude angle of main body part 1. Correction section 41 controls display control section 51 so as to accommodate (reduce) the variation of the position of virtual image 300 in object space 400 due to the variation of the attitude angle of main body part 1 at least for first virtual image 301, and changes the position of image 700 at display surface 20.

Figure 5A:
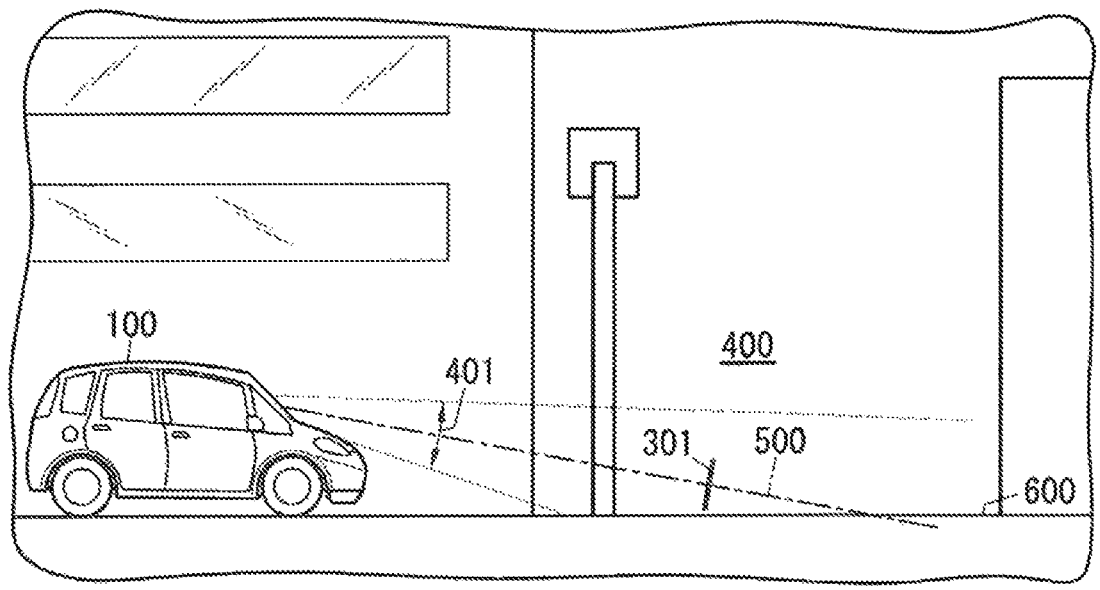
FIG. 5A is a schematic side view of the automobile that is not tilted.
Figure 5B:
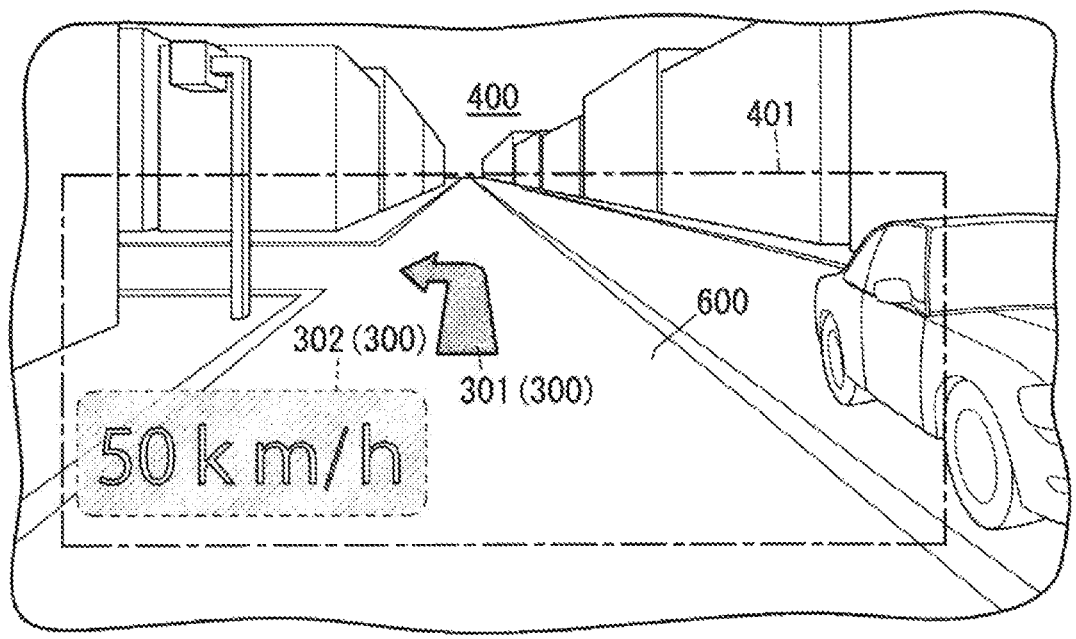
FIG. 5B is a conceptual view illustrating the field of view of the user driving the automobile in the state illustrated in FIG. 5A.

More specifically, as illustrated in FIG. 5A and FIG. 5B, in the state where the attitude angle of automobile 100 is a reference angle (e.g., 0 degrees), correction section 41 displays virtual image 300 at a default display position without changing the display position of virtual image 300 (first virtual image 301) relative to main body part 1. Here, the default display position of first virtual image 301 is an approximate center portion of display region 401, i.e., a position where optical axis 500 (see FIG. 5A) passes. Here, first virtual image 301 represents an arrow indicating "left turn" at a T-junction in front of automobile 100. That is, in the field of view of user 200, first virtual image 301 is displayed in a superimposed manner on the T-junction in a real scenery in display region 401. In addition, second virtual image 302 is displayed at a lower left corner in display region 401 (see FIG. 5B).

Figure 6A:
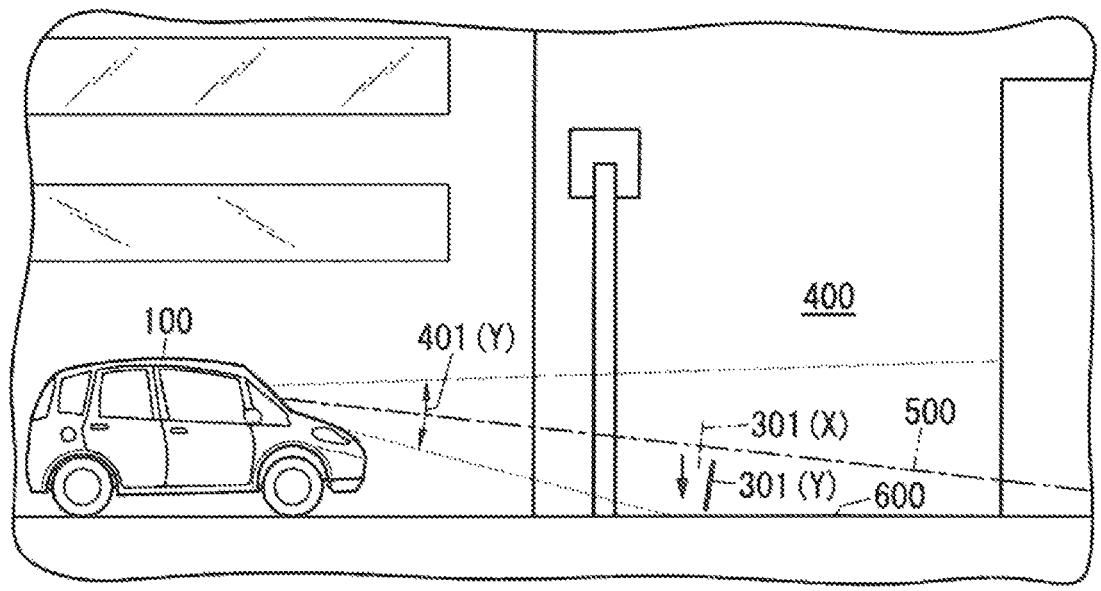
FIG. 6A is a schematic side view illustrating the automobile in a tilted state.
Figure 6B:
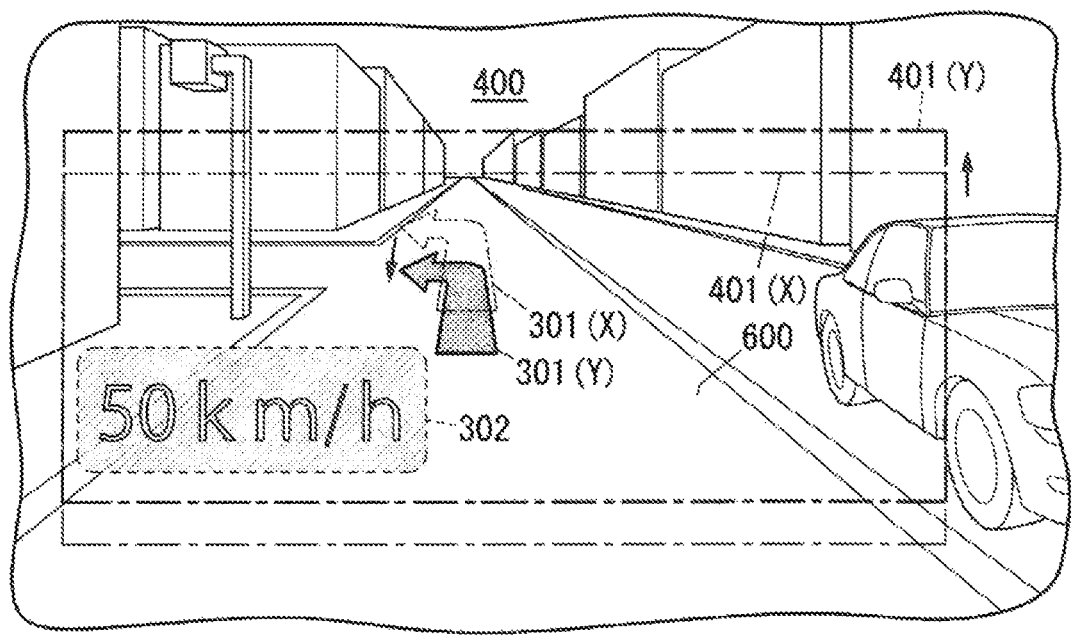
FIG. 6B is a conceptual view illustrating the field of view of the user driving the automobile in the state illustrated in FIG. 6A.

On the other hand, as illustrated in FIG. 6A and FIG. 6B, when the attitude angle of automobile 100 is shifted from the reference angle and automobile 100 is tilted rearward for example, correction section 41 changes the display position of virtual image 300 (first virtual image 301) relative to main body part 1 from the default display position. Specifically, in this state, display region 401 (X) moves upward and display region 401 (Y) is formed at a position shifted upward from display region 401 (X) in the field of view of user 200 as illustrated in FIG. 6B. In this manner, at a default display position, first virtual image 301 (X) is displayed at an approximate center portion of display region 401 (Y). As such, in the field of view of user 200, first virtual image 301 (X) is displayed in a superimposed manner at a position shifted forward from the T-junction in a real scenery. Note that in FIG. 6A and FIG. 6B, the region where virtual image 300 can be projected in object space 400 is displayed as display region 401. In addition, a movement of display region 401 and first virtual image 301 is caused. In view of this, for discrimination, "X" is attached to the reference numerals of display region 401 and first virtual image 301 before the movement, and "Y" is attached to the reference numerals of display region 401 and first virtual image 301 after the movement.

In this case, correction section 41 changes the display position of virtual image 300 by changing the position of image 700 at display surface 20. As such, as illustrated in FIG. 6A, the display position of first virtual image 301 (X) relative to main body part 1 moves downward, and first virtual image 301 (Y) is displayed at a position shifted downward from first virtual image 301 (X) in display region 401 (Y). As a result, in the field of view of user 200, as illustrated in FIG. 6B, first virtual image 301 (Y) is displayed in a superimposed on manner on the T-junction in a real scenery in display region 401 (Y). In addition, second virtual image 302 is displayed at a position at a lower left corner in display region 401 (Y) (see FIG. 6B).

Details of Attitude Angle Calculation Section

As described above, in image display system 10, the attitude angle of main body part 1 is calculated from the time-series data of detection value G (acceleration detection value) of acceleration sensor 52, and the display position of image 700 at display surface 20 is corrected in accordance with the attitude angle. At this time, if automobile 100 is subjected to a disturbance, the attitude angle of main body part 1 cannot be correctly calculated. In view of this, image attitude angle calculation section 43 of display system 10 removes detection value G affected by the disturbance received by automobile 100 in the time-series data of detection value G of acceleration sensor 52 to calculate the attitude angle of main body part 1. Note that "disturbance" is, for example, an external force that affects the attitude angle of automobile 100, such as an upward force that is exerted when automobile 100 goes over a stone and the like on the road surface or a curb. A configuration of such an attitude angle calculation section is elaborated below.

Figure 7:
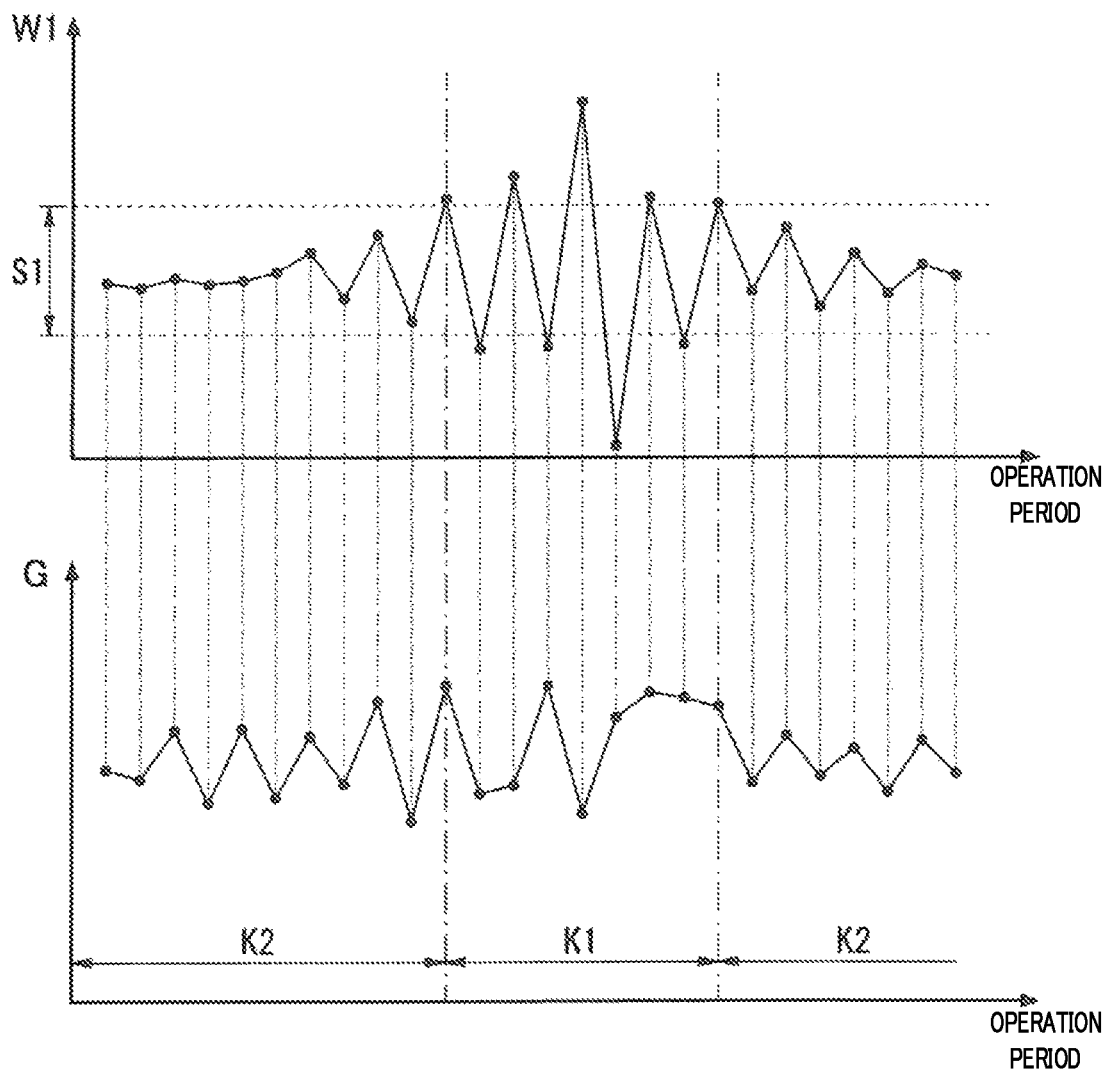
FIG. 7 is a diagram illustrating a comparison between detection value G of an acceleration sensor in the image display system and ratio W1 of acceleration components in two directions of the acceleration sensor.

Attitude angle calculation section 43 calculates the attitude angle of main body part 1 on the basis of the time-series data of detection value G of acceleration sensor 52. More specifically, as illustrated in FIG. 7, attitude angle calculation section 43 excludes detection value G (acceleration detection value) of acceleration sensor 52 included in out-of-threshold range period K1 (exclusion period) in the operation period (predetermined period) of acceleration sensor 52, from the time-series data of detection value G used in the calculation of the attitude angle of main body part 1. That is, attitude angle calculation section 43 calculates the attitude angle of main body part 1 on the basis of the time-series data of detection value G included in in-threshold value range period K2.

Here, "operation period" is a period in which acceleration sensor 52 operates to detect the acceleration that acts on automobile 100 (in the present embodiment, motion acceleration), which may be the entire period or a part of the period during operation of acceleration sensor 52. The "out-of-threshold range period K1" is a period in which the ratio W1 (=Gz/Gx) of acceleration components Gz and Gx in two directions that constitute detection value G of acceleration sensor 52 falls outside threshold value range S1. In-threshold value range period K2 is a period in which ratio W1 falls within threshold value range S1. The "two directions" include the vertical axis Az direction (vertical direction) and the front-rear axis AX direction (front-rear direction) orthogonal to the vertical axis Az direction.

In this manner, attitude angle calculation section 43 improves the accuracy of the attitude angle of main body part 1 calculated at correction section 41 by excluding detection value G included in out-of-threshold range period K1 in the operation period of acceleration sensor 52 from the time-series data of detection value G used in the calculation of the attitude angle of main body part 1. As a result, at correction section 41, the display position of image 700 at front shield 101 can be more accurately corrected.

Figure 8A:
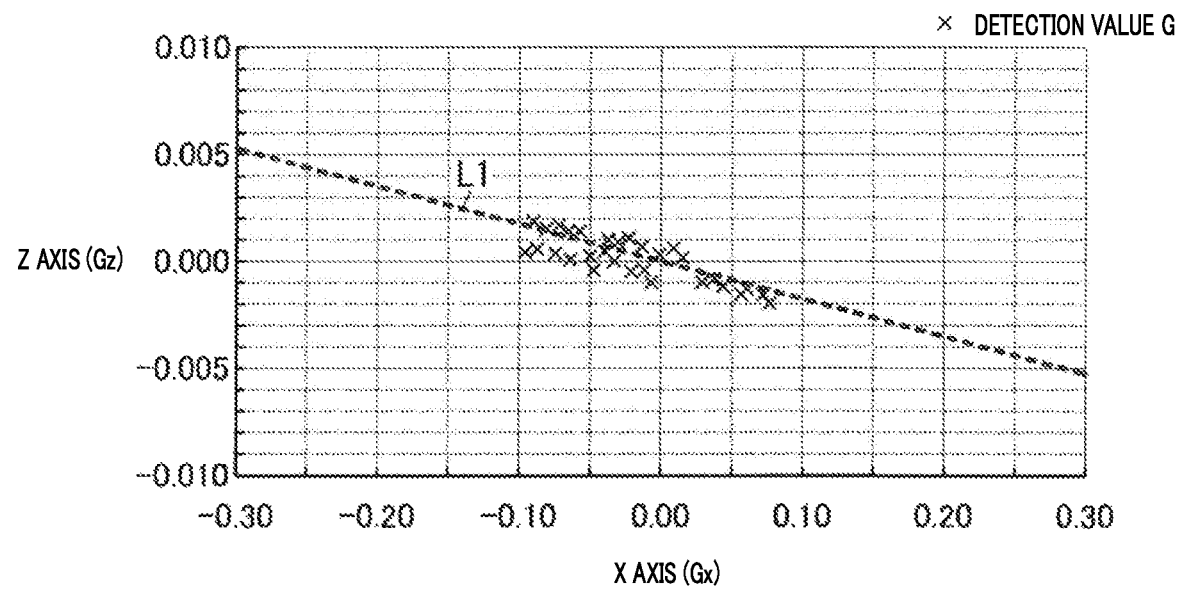
FIG. 8A is a graph illustrating an exemplary distribution of detection value G of the acceleration sensor in the case where the automobile is subjected to no disturbance.
Figure 8B:
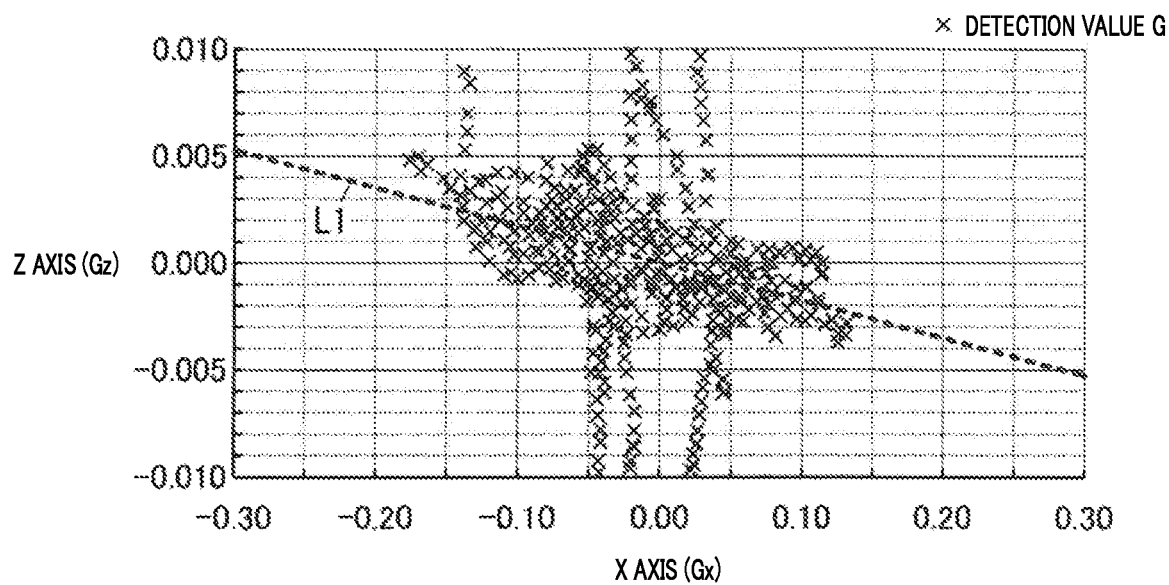
FIG. 8B is a graph illustrating an exemplary distribution of detection value G of the acceleration sensor in the case where the automobile is subjected to a disturbance.

FIG. 8A and FIG. 8B are graphs illustrating time-series data of detection value G for a certain period of acceleration sensor 52 in the form of points in xz-coordinates. In FIG. 8A and FIG. 8B, the x axis is front-rear axis Ax of automobile 100, and the z axis is the vertical axis Az of automobile 100. As illustrated in FIG. 8A, when automobile 100 is subjected to no disturbance, each point indicating detection value G is located on straight line L1 with a constant gradient. It should be noted that as illustrated in FIG. 8B, when automobile 100 is subjected to a disturbance, each point indicating detection value G is not only located on straight line L1, but also located at a position shifted from straight line L1.

Straight line L1 indicates a distribution of detection value G in the case where automobile 100 is subjected to no disturbance. The gradient of straight line L1 varies depending on the attitude angle of automobile 100. FIG. 8A and FIG. 8B assume that the attitude angle of automobile 100 being subjected to no disturbance is 1 degree. For example, depending on whether a passenger is present in the rear seat of automobile 100, the attitude angle of automobile 100 differs, and the gradient of straight line L1 also differs.

As illustrated in FIG. 8A, through the use of the time-series data of detection value G located on straight line L1 when calculating the attitude angle of automobile 100, the attitude angle of automobile 100 can be accurately calculated. The graph of FIG. 8B becomes the graph as illustrated in FIG. 8A when points affected by the disturbance is removed from the graph of FIG. 8B, and this removal corresponds to removal of detection value G detected in the out-of-threshold range period K1 illustrated in FIG. 7.

That is, detection value G in out-of-threshold range period K1 where ratio W1 is outside threshold value range S1 in FIG. 7 is detection value G corresponding to points shifted from straight line L1 of FIG. 8B. In view of this, the attitude angle of main body part 1 can be more accurately calculated by excluding detection value G in out-of-threshold range period K1 from the time-series data of detection value G used for the calculation of the attitude angle of main body part 1.

Threshold value range S1 is determined in accordance with the state of automobile 100. For example, detection values G detected in a certain interval are plotted at the interval on the xz-coordinates as illustrated in FIG. 8B on the basis of the time-series data of detection value G of acceleration sensor 52, and a correlation straight line is determined based on the distribution of the plotted points. Then, assuming the correlation straight line as straight line L1, ratio W1 may be calculated from the gradient of assumed straight line L1, and a given range centered on ratio W1 may be set as threshold value range S1. For example, in the case where the value of ratio W1 is 0.1, for example, threshold value range S1 may be set within the range of 0.1±0.1, whereas in the case where the value of ratio W1 is 0.5, for example, threshold value range S1 may be set within the range of 0.5±0.1. In addition, for example, the average value of detection value G detected in a certain interval may be determined at the interval on the basis of detection value G of acceleration sensor 52, and the given range centered on the average value may be set as threshold value range S1. For example, in the case where the average value is 0.3, threshold value range S1 may be set to 0.3±0.1, for example.

Attitude angle calculation section 43 includes filter part 431 and calculation section main body 432.

Filter part 431 removes detection value G included in out-of-threshold range period K1 in the time-series data of detection value G of acceleration sensor 52, and outputs only detection value G included in in-threshold value range period K2 to calculation section main body 432. More specifically, filter part 431 sets threshold value range S1 in the above-described manner on the basis of the time-series data of detection value G of acceleration sensor 52. Then, every time when the time-series data of detection value G of a certain operation period is acquired from acceleration sensor 52, filter part 431 removes detection value G included in out-of-threshold range period K1 in the certain operation period. Then, filter part 431 outputs detection value G included in in-threshold value range period K2 to calculation section main body 432.

Note that in the present embodiment, by statistically processing the time-series data of detection value G for each given operation time, out-of-threshold range period K1 and in-threshold value range period K2 are determined, detection value G in out-of-threshold range period K1 is removed, and detection value G in in-threshold value range period K2 is output to calculation section main body 432. Alternatively, only detection value G within threshold value range S1 may be output to calculation section main body 432 by determining in real time whether detection value G of acceleration sensor 52 is within threshold value range S1 one by one.

On the basis of the time-series data of detection value G output from filter part 431, calculation section main body 432 calculates the attitude angle of automobile 100, and sets the calculated attitude angle as the attitude angle of main body part 1.

In image display system 10 according to the present embodiment, attitude angle calculation section 43 excludes detection value G included in out-of-threshold range period K1 in the operation period of acceleration sensor 52 from the time-series data of detection value G used in the calculation of the attitude angle of main body part 1. Thus, the accuracy of the calculated attitude angle of main body part 1 can be improved. As a result, the display position of image 700 at front shield 101 can be more precisely corrected.

Modification of Embodiment 1

Embodiment 1 is merely one of various embodiments of the present invention. Embodiment 1 may be modified in various ways according to the design, etc., as long as objects of the invention can be achieved. Further, the aspects of according to Embodiment 1 is not limited to the embodiment using single image display system 10. For example, the aspects according to Embodiment 1 may be embodied with a storage medium storing an image display method, a computer program, or a program and the like. Modifications described below may be appropriately combined in accordance with application.

The above-mentioned image display method is an image display method for controlling image display system 10 mounted in moving body 100. This image display method includes an image projection process of projecting and displaying image 700 on display object 101 of moving body 100, an attitude angle calculation process of calculating attitude angle β of moving body 100 on the basis of the time-series data of acceleration detection value G of the acceleration of moving body 100 in a predetermined period (the operation period of acceleration sensor 52), and a display control process of controlling the display position for projecting and displaying image 700 to display object 101 in accordance with the attitude angle calculated by the attitude angle calculation process. Acceleration detection value G includes components of two directions, Gz and Gx. In the attitude angle calculation process, acceleration detection value G included in exclusion period K1 where ratio W1 of components of two directions is outside predetermined range S1 in the predetermined period is excluded from the time-series data used for calculation of attitude angle.

Modification 1

Figure 9:
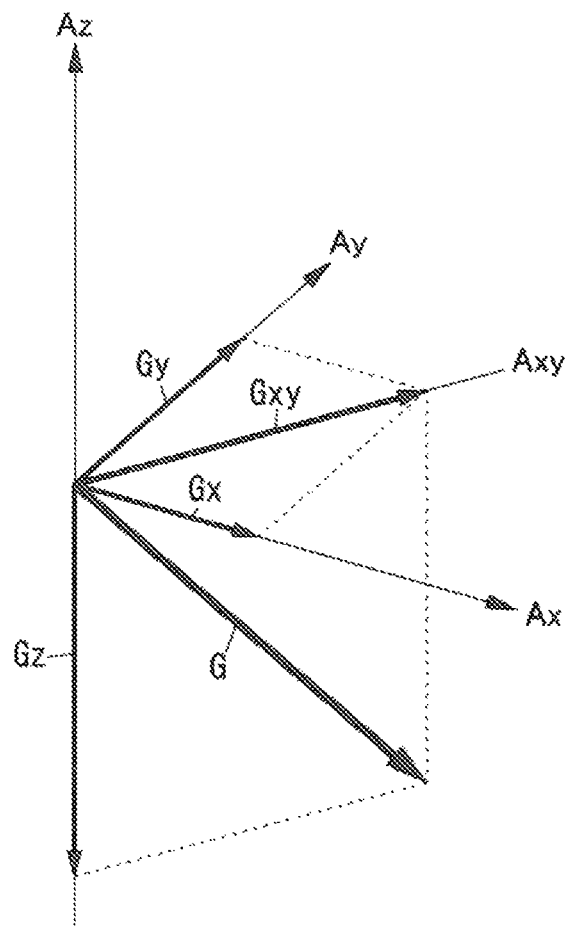
FIG. 9 is a diagram for describing an acceleration component of an acceleration sensor according to Modification 1 of Embodiment 1.

Acceleration sensor 52 is a biaxial acceleration sensor in Embodiment 1, but may be a triaxial acceleration sensor. In this case, as illustrated in FIG. 9, ratio W1 used for the calculation at filter part 431 is a value obtained by dividing acceleration component Gz in detection value G of acceleration sensor 52 by acceleration component Gxy. Acceleration component Gxy is an acceleration component obtained by combining acceleration component Gx in the front-rear axis AX direction (front-rear direction) and acceleration component Gy in the horizontal axis Ay direction (horizontal direction) in detection value G in terms of vector. The horizontal axis Ay direction is orthogonal to both the vertical axis Az direction (vertical direction) and the front-rear axis AX direction (front-rear direction). In this case the above-mentioned two directions in the ratio of acceleration components Gxy and Gz of two directions that constitute detection value G are the vertical axis Az direction and the axis AxY direction of main body part 1. The axis Axy is a direction along the acceleration component obtained by combining acceleration component Gx in the front-rear axis AX direction and acceleration component Gy in the horizontal axis Ay direction in detection value G in terms of vector. That is, the axis Axy is an axis along a straight line connecting the origin 0 and the point corresponding to acceleration component Gxy.

According to Modification 1, inclination in the front-rear direction and the inclination in the horizontal direction of the attitude of main body part 1 (i.e., automobile 100) can be detected with acceleration sensor 52. Thus, the display position of image 700 at front shield 101 can be more precisely corrected.

Modification 2

Figure 10:
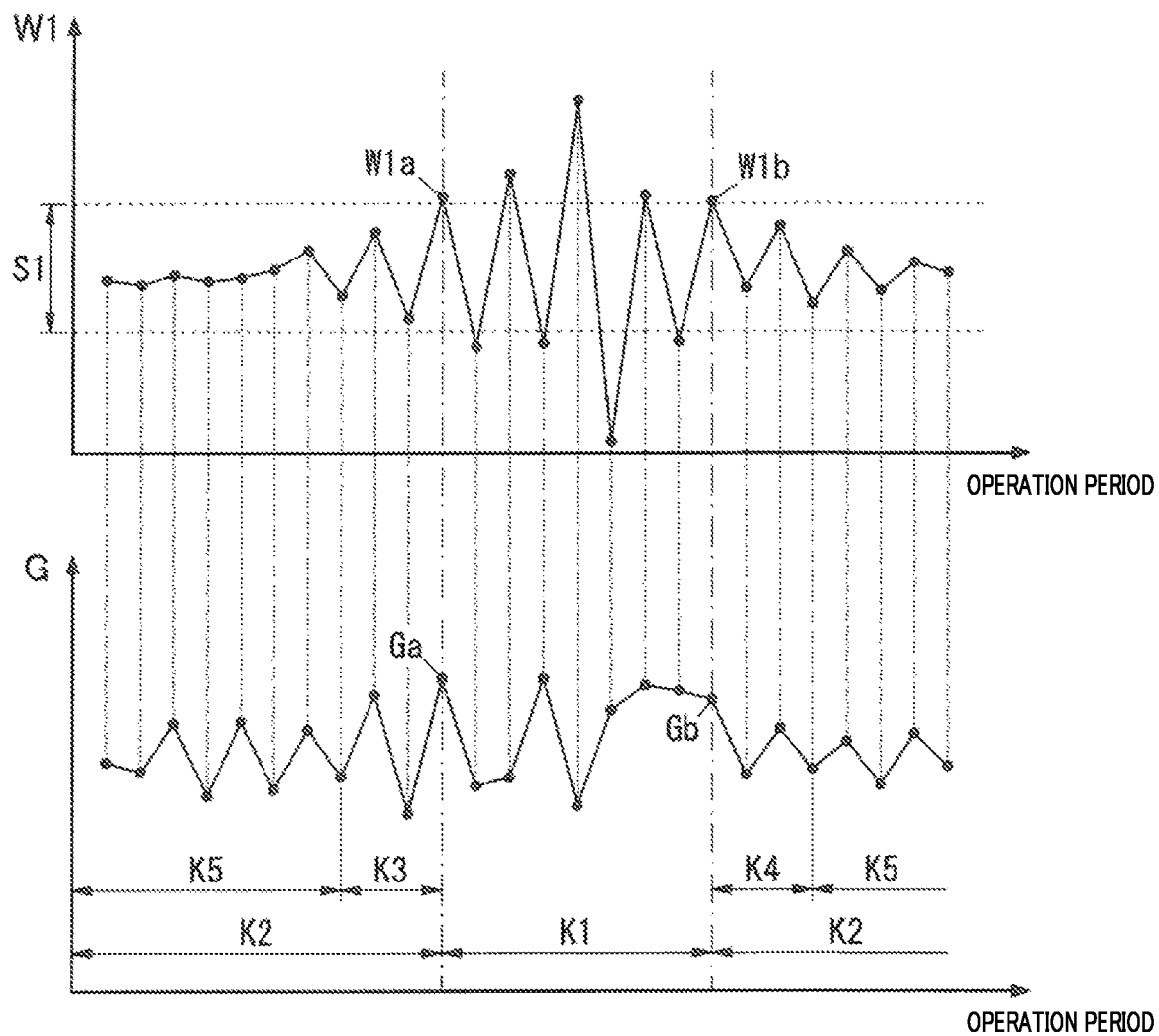
FIG. 10 is a diagram illustrating a comparison between detection value G of an acceleration sensor and ratio W1 of acceleration components in two directions of the acceleration sensor in an image display system according to Modification 2 of Embodiment 1.

In Embodiment 1, as illustrated in FIG. 10, additional periods K3 and K4 may be provided before and after out-of-threshold range period K1 (exclusion period). In this case, in the operation period (predetermined period) of acceleration sensor 52, filter part 431 excludes not only detection value G included in out-of-threshold range period K1, but also detection value G included in additional periods K3 and K4. Then, filter part 431 outputs only the time-series data of the detection value (the detection value of acceleration sensor 52) detected in remaining period K5 to calculation section main body 432. Note that period K5 is a period obtained by excluding additional periods K3 and K4 from in-threshold value range period K2.

With this configuration, not only detection value G in out-of-threshold range period K1, but also detection value G in additional periods K3 and K4 can be excluded. Additional periods K3 and K4 are contiguous with out-of-threshold range period K1, and therefore it is highly possible that ratio W1 corresponding to detection value G in additional periods K3 and K4 is a value close to the threshold value of threshold value range S1 within threshold value range S1 (predetermined range). By excluding such a detection value G in additional periods K3 and K4, the attitude angle of main body part 1 (i.e., the attitude angle of automobile 100) can be more accurately calculated.

The lengths of additional periods K3 and K4 are set to a fixed predetermined length in advance. It should be noted that the lengths of additional periods K3 and K4 may be changed in accordance with the length of out-of-threshold range period K1. For example, the lengths of additional periods K3 and K4 may be set to be lengthened as the length of out-of-threshold range period K1 is lengthened. In the case where out-of-threshold range period K1 is long, it is highly possible that ratio W1 corresponding to detection value G in additional periods K3 and K4 maintains values near the threshold value of threshold value range S1 for long periods of time. In view of this, by setting the lengths of additional periods K3 and K4 in accordance with the length of out-of-threshold range period K1, detection value G whose ratio W1 has a value near the threshold value of threshold value range S1 can be excluded from detection value G in in-threshold value range period K2. In this manner, the attitude angle of main body part 1 (i.e., the attitude angle of automobile 100) can be more accurately calculated.

In addition, the length of additional period K3 may be changed in accordance with the amount of variation of ratio W1a corresponding to the first detection value Ga in the order of time in detection value G in out-of-threshold range period K1. For example, the length of additional period K3 may be set to be lengthened as the amount of variation of ratio W1a increases. In addition, the length of additional period K4 may be changed in accordance with the amount of variation of ratio W1b corresponding to the last detection value Gb in the order of time in detection value G in out-of-threshold range period K1. For example, the length of additional period K4 may be set to be lengthened as the amount of variation of ratio W1b increases. Note that the amount of variation of ratios W1a and W1b is, for example, a deviation amount from the center value of threshold value range S1.

In the case where the amount of variation of ratios W1a and W1b is large, it is highly possible that ratio W1 corresponding to detection value G in additional periods K3 and K4 maintains values near the threshold value of threshold value range S1 for long periods of time. In view of this, by setting long lengths of additional periods K3 and K4 in accordance with the amount of variation of ratios W1a and W1b, detection value G whose ratio W1 has a value near the threshold value of threshold value range S1 can be excluded from detection value G in in-threshold value range period K2. In this manner, the attitude angle of main body part 1 (i.e., the attitude angle of automobile 100) can be more accurately calculated.

Note that while additional periods K3 and K4 are provided both before and after out-of-threshold range period K1 in the present modification, additional periods K3 and K4 may be provided at least one of before and after out-of-threshold range period K1.

Other Modifications

Image display system 10 is not limited to heads-up displays used in automobile 100, but can also be applied to moving vehicles other than automobile 100, such as motorcycles, trains, aircraft, construction machinery, and ships. Further, image display system 10 is not limited to moving bodies. For example, image display system 10 may be used in an amusement facility, a wearable terminal such as a head mounted display (HMD), a medical facility, or a stationary device. Image display system 10 may also be used as an electronic view finder, for example, incorporated into a digital camera or other equipment.

Embodiment 2

Figure 11:
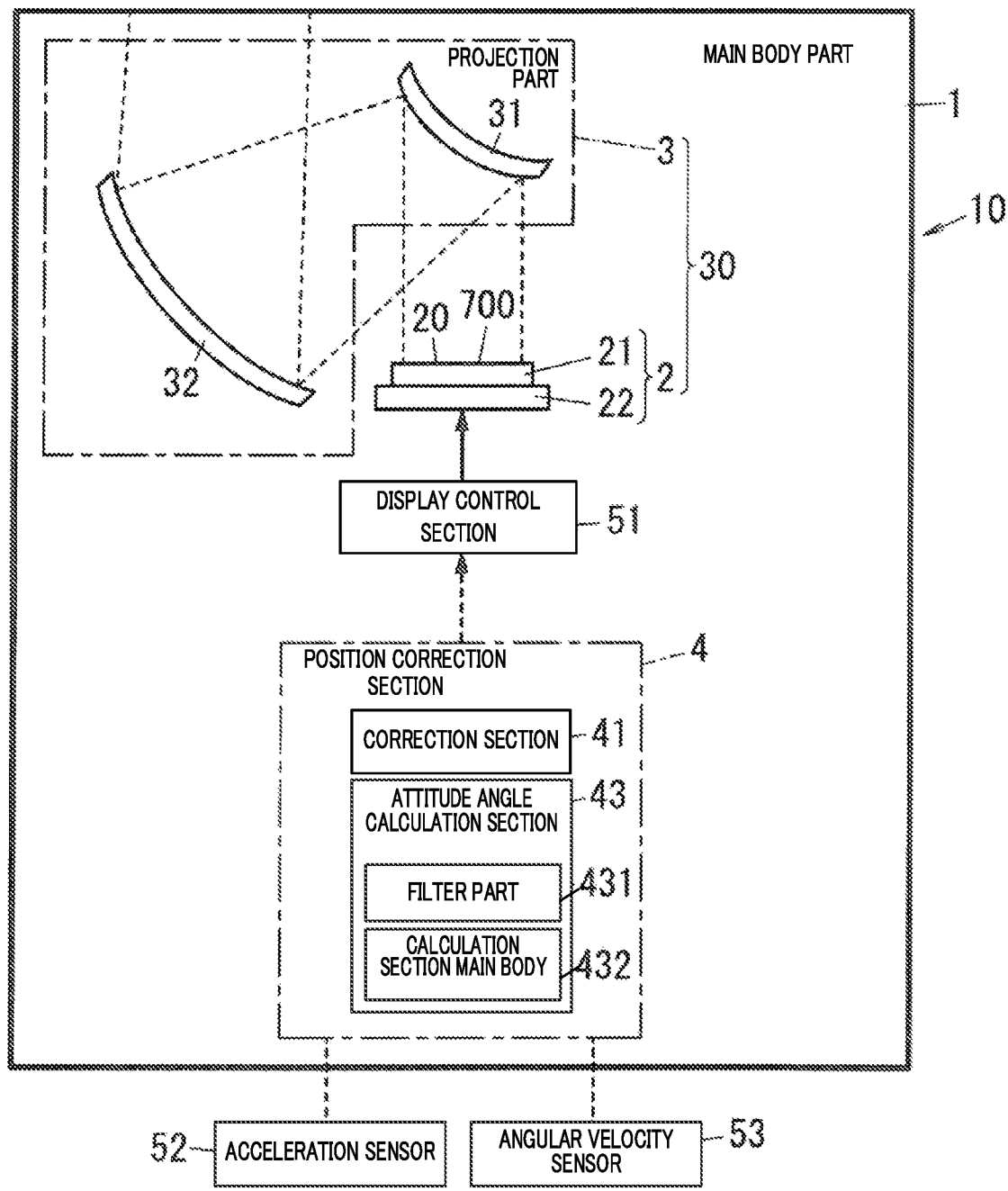
FIG. 11 is a conceptual view illustrating a configuration of an image display system according to Embodiment 2.
Figure 12:
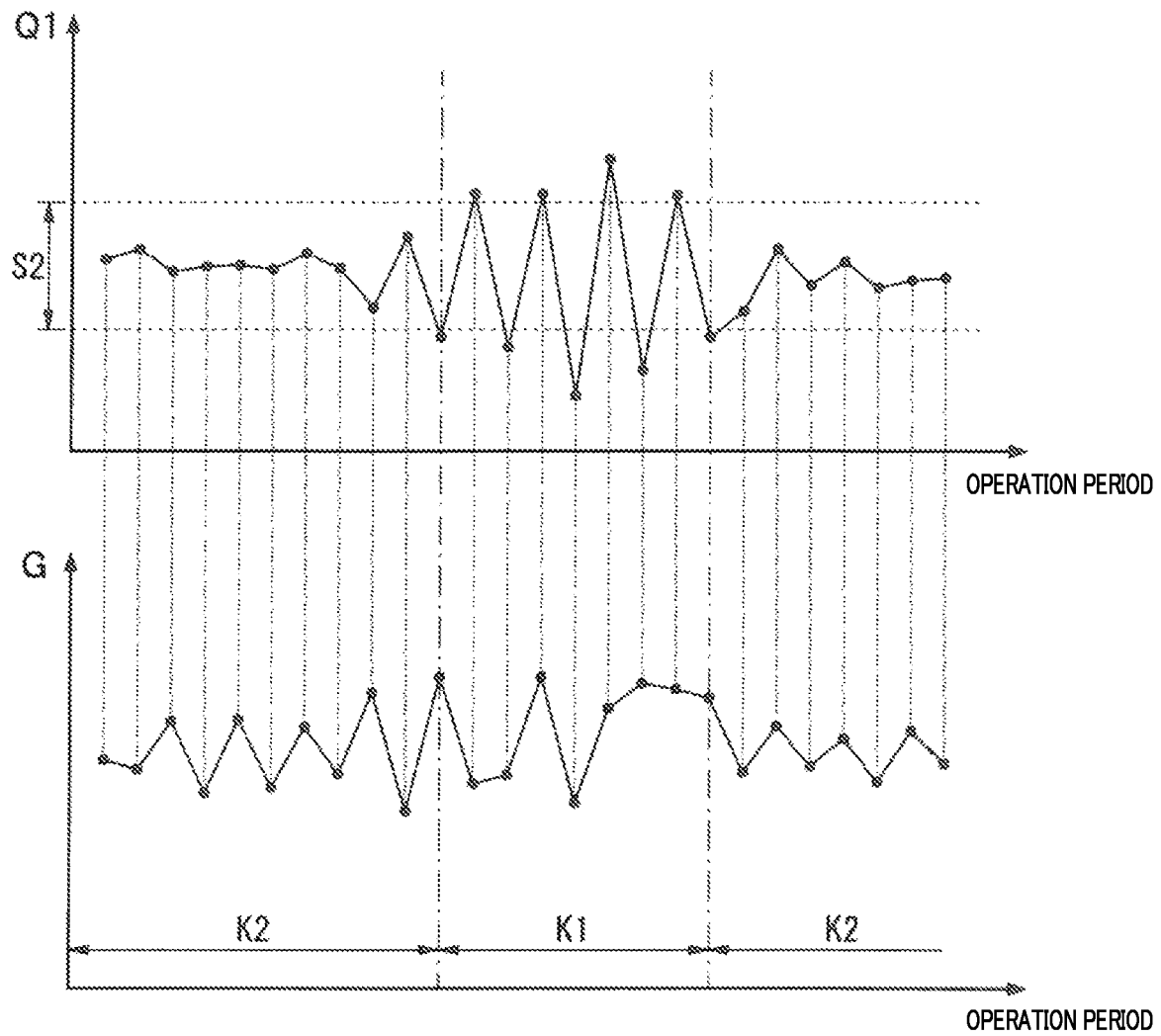
FIG. 12 is a diagram for describing a relationship between acceleration detection value G of an acceleration sensor of the image display system according to Embodiment 2 and angular velocity detection value Q1 of the angular velocity sensor.

In comparison with Embodiment 1, Embodiment 2 differs in condition of out-of-threshold range period K1 (exclusion period) of filter part 431. More specifically, image display system 10 according to the present embodiment further includes angular velocity sensor 53 as illustrated in FIG. 11. Angular velocity sensor 53 detects the angular velocity (i.e., pitch angle) around the horizontal axis of automobile 100. That is, angular velocity sensor 53 detects the angular velocity around the horizontal axis of main body part 1. Out-of-threshold range period K1 of the present embodiment is a period in which angular velocity detection value Q1 of angular velocity sensor 53 that detects the angular velocity (pitch angle) of main body part 1 is outside threshold value range S2 in the operation period (predetermined period) of acceleration sensor 52 (see FIG. 12).

Specifically, attitude angle calculation section 43 of the present embodiment excludes acceleration detection value (acceleration sensor 52 detection value) G included in out-of-threshold range period K1 in the operation period of acceleration sensor 52 from the time-series data of acceleration detection value G used in the calculation of the attitude angle of main body part 1. Out-of-threshold range period K1 is a period in which angular velocity detection value Q1 of angular velocity sensor 53 that detects the angular velocity of main body part 1 (i.e., the angular velocity of automobile 100) is outside threshold value range S2 (predetermined range).

In the present embodiment, threshold value range S2 may be set as a given range centered on an average value by determining the average value of angular velocity detection value Q1 detected in a certain period at a certain interval on the basis of angular velocity detection value Q1 of angular velocity sensor 53.

According to the present embodiment, as in Embodiment 1, the accuracy of the attitude angle of main body part 1 calculated at correction section 41 can be improved. As a result, the display position of image 700 at front shield 101 can be more precisely corrected.

Note that Embodiment 1 and 2 may be combined. Specifically, attitude angle calculation section 43 may exclude acceleration detection value G included in the exclusion period in which ratio W1 of components of two directions is outside predetermined range S1 in the operation period (predetermined period) of acceleration sensor 52 from the time-series data of acceleration detection value G used for the calculation of attitude angle β, while further excluding the acceleration detection value included in the exclusion period in which angular velocity detection value Q1 of the angular velocity of automobile 100 is outside predetermined range S2 from the above-mentioned time-series data of detection value G used for the calculation of attitude angle β. With this configuration, the accuracy of calculated attitude angle β can be further improved.

Modification of Embodiment 2

Embodiment 2 is merely one of various embodiments of the present invention. Embodiment 2 may be modified in various ways according to the design, etc., as long as objects of the invention can be achieved. Further, the aspects of according to Embodiment 2 is not limited to the embodiment using single image display system. For example, the aspects of according to Embodiment 1 may be embodied using a storage medium storing an image display method, a computer program, or a program, and the like. Modifications described below may be appropriately combined.

The above-mentioned image display method is an image display method for controlling image display system 10 mounted in moving body 100. This image display method includes an image projection process of projecting and displaying image 700 on display object 101 of moving body 100, an attitude angle calculation process of calculating attitude angle β of moving body 100 on the basis of the time-series data of acceleration detection value G of the acceleration of moving body 100 in a predetermined period (the operation period of acceleration sensor 52), and a display control process of controlling the display position for projecting and displaying image 700 to display object 101 in accordance with the attitude angle calculated by the attitude angle calculation process. Acceleration detection value G includes components of two directions, Gz and Gx. In the attitude angle calculation process, acceleration detection value G included in exclusion period K1 where angular velocity detection value Q1 of the angular velocity of moving body 100 is outside predetermined range Q2 is excluded from the time-series data used for calculation of the attitude angle.

Modification 1

In Embodiment 2, angular velocity sensor 53 detects the angular velocity around the horizontal axis of automobile 100 (the pitch angle of automobile 100). It should be noted that angular velocity sensor 53 may detect the angular velocity around the front-rear axis of automobile 100 (the roll angle of automobile 100), or the angular velocity around the vertical axis (the yaw angle) of automobile 100. In addition, angular velocity sensor 53 may detect at least one of the angular velocity around the vertical axis, the angular velocity around the front-rear axis and the angular velocity around the horizontal axis of automobile 100. In the case where angular velocity sensor 53 detects angular velocities around two or more axes, the threshold value range is set for each acceleration around each axis.

Modification 2

In Embodiment 2, as in Embodiment 1, an additional period may be provided before and after out-of-threshold range period K1.

Conclusion

Image display system (10) according to a first aspect is configured to be mounted in moving body (100), image display system (10) including: image projection part (30) configured to display image (700) by projecting image (700) to display object (101) of moving body (100); an attitude angle calculation section (43) configured to calculate attitude angle (β) of moving body (100) on a basis of time-series data of acceleration detection value (G) of an acceleration of moving body (100) in a predetermined period; and display control section (51) configured to control a position where image (700) is displayed and projected at display object (101) in accordance with the attitude angle (β) calculated by attitude angle calculation section (43). Acceleration detection value (G) includes components (Gx, GZ) of two directions. Attitude angle calculation section (43) excludes acceleration detection value (G) included in exclusion period (K1) in which ratio (W1) of the components of two directions is outside predetermined range (S1) in the predetermined period, from the time-series data used for calculation of the attitude angle (β).

With this configuration, attitude angle calculation section (43) excludes acceleration detection value (G) included in exclusion period (K1), from the time-series data of acceleration detection value (G) used for calculation of attitude angle (β) of moving body (100). In this manner, the accuracy of calculated attitude angle (β) can be improved. As a result, the display position of image (700) at display object (101) can be more precisely corrected.

In image display system (10) according to a second aspect, in the first aspect, attitude angle calculation section (43) further excludes acceleration detection value (G) included in exclusion period (K1) in which an angular velocity detection value (Q1) of an angular velocity of moving body (100) is outside predetermined range (S2), from the time-series data used for calculation of the attitude angle (β).

With this configuration, the accuracy of calculated attitude angle (β) can be further improved.

In image display system (10) according to a third aspect, in the first or second aspect, the two directions include a vertical direction (Az axis direction) of moving body (100) and an orthogonal direction orthogonal to the vertical direction (Az axis direction).

With this configuration, with the time-series data of acceleration detection value (G), attitude angle (β) of moving body (100) can be more correctly detected. In this manner, the display position of image (700) at display object (101) can be more precisely corrected.

In image display system (10) according to a fourth aspect, in the third aspect, wherein the orthogonal direction is a front-rear direction (Ax axis direction) of moving body (100).

With this configuration, with the time-series data of acceleration detection value (G), the inclination of the attitude of moving body (100) in the front-rear direction can be detected.

In image display system (10) according to a fifth aspect, in any one of first to third aspects, the two directions are a vertical direction (Az axis direction) of moving body (100), and a direction along acceleration component (Gxy) obtained by combining acceleration component (Gx) in a front-rear direction (Ax axis direction) of moving body (100) and an acceleration component (Gy) in horizontal direction (Ay axis direction) of moving body (100) in acceleration detection value (G) in terms of vector.

With this configuration, with acceleration detection value (G), the inclination of the attitude of moving body (100) in the front-rear direction and the horizontal direction can be detected.

In image display system (10) according to a sixth aspect, in the second aspect, the angular velocity is at least one of an angular velocity around a vertical axis (Az axis direction) of moving body (100), an angular velocity around a front-rear axis (Ax axis direction) of moving body (100), and an angular velocity around a horizontal axis (Ay axis direction) of moving body (100).

With this configuration, with angular velocity detection value (Q1), at least one of the yaw angle, pitch angle, and roll angle of moving body (100) can be detected. In this manner, acceleration detection value (G) of a case where at least one of the yaw angle, pitch angle and roll angle of moving body (100) is significantly changed can be excluded. As a result, the display position of image (700) at display object (101) can be more precisely corrected.

In image display system (10) according to a seventh aspect, in any one of the aspects 1 to 6, attitude angle calculation section (43) excludes acceleration detection value (G) included in an additional period (K3, K4) contiguous with the exclusion period (K1), from the time-series data used for calculation of the attitude angle (β).

With this configuration, not only acceleration detection value (G) in exclusion period (K1), but also acceleration detection value (G) in additional period (K3, K4) can be excluded. Additional periods (K3, K4) are contiguous with exclusion period (K1), and therefore it is highly possible that ratio (W1) corresponding to acceleration detection value (G) in additional period (K3, K4) is a value close to the threshold value of predetermined range (S1) within predetermined range (S1). By excluding acceleration detection value (G) in additional period (K3, K4), attitude angle (β) of moving body (100) can be more accurately calculated.

In image display system (10) according to an eighth aspect, in the seventh aspect, the additional period (K3, K4) is provided at least at one of before and after the exclusion period (K1).

With this configuration, acceleration detection value (G) in additional period (K3, K4) provided at least one of before and after exclusion period (K1) can be excluded.

In image display system (10) according to a ninth aspect, in the seventh or eighth aspect, the longer the exclusion period (K1), the longer the additional period (K3, K4).

With this configuration, it is possible to achieve a setting in which the longer exclusion period (K1), the longer additional period (K3, K4). In the case where exclusion period (K1) is long, it is highly possible that ratio (W1) corresponding to acceleration detection value (G) in additional period (K3, K4) maintains a value near the threshold value of predetermined range (S1) for long periods of time. In view of this, by the setting in which the longer exclusion period (K1), the longer additional period (K3, K4), detection value (G) whose ratio (W1) has a value near the threshold value of predetermined range S1 can be excluded from detection value (G) in in-threshold value range period (K2). In this manner, attitude angle (β) of moving body (100) can be more accurately calculated.

Image display system (10) according to a tenth aspect is configured to be mounted in moving body (100), image display system (10) including: image projection part (30) configured to display image (700) by projecting image (700) to display object (101) of moving body (100); an attitude angle calculation section (43) configured to calculate attitude angle (β) of moving body (100) on a basis of time-series data of acceleration detection value (G) of an acceleration of moving body (100) in a predetermined period; and display control section (51) configured to control a position where image (700) is displayed and projected at display object (101) in accordance with the attitude angle (β) calculated by attitude angle calculation section (43). Attitude angle calculation section (43) excludes acceleration detection value (G) included in exclusion period (K1) in which an angular velocity detection value (Q1) of an angular velocity of moving body (100) is outside a predetermined range (S2), from the time-series data used for calculation of the attitude angle (β).

With this configuration, attitude angle calculation section (43) excludes acceleration detection value (G) included in exclusion period (K1) where angular velocity of detection value (Q1) of the angular velocity of moving body (100) is outside predetermined range (S2), from the time-series data of acceleration detection value (G) used for calculation of attitude angle (β) of moving body (100). In this manner, the accuracy of calculated attitude angle (β) can be improved. As a result, the display position of image (700) at display object (101) can be more precisely corrected.

In image display system (10) according to a third aspect, in the first aspect, the two directions include a vertical direction (Az axis direction) of moving body (100) and an orthogonal direction orthogonal to the vertical direction (Az axis direction).

Moving body (100) according to an eleventh aspect includes: image display system (10) according to any one of the first to tenth aspects; and a moving body main body in which image display system (10) is mounted. Display object (101) is a windshield of the moving body main body.

With this configuration, moving body (100) including the image display system (10) can be provided.

An image display method according to a twelfth aspect is a method of controlling image display system (10) configured to be mounted in moving body (100), the method including: image (700) projection process of displaying image (700) by projecting image (700) to display object (101) of moving body (100); attitude angle (β) calculation process of calculating an attitude angle (β) of the moving body on a basis of time-series data of acceleration detection value (G) of an acceleration of moving body (100) in a predetermined period; and a display control process of controlling a position where image (700) is displayed and projected at display object (101) in accordance with the attitude angle (β) calculated by the attitude angle (β) calculation process, wherein acceleration detection value (G) includes components (Gx, GZ) of two directions. The attitude angle (β) calculation process excludes acceleration detection value (G) included in exclusion period (K1) in which ratio (W1) of components of two directions is outside predetermined range (S1) in the predetermined period, from the time-series data used for calculation of the attitude angle (β).

With this configuration, the accuracy of calculated attitude angle (β) can be improved. As a result, the display position of image (700) at display object (101) can be more precisely corrected.

An image display method according to a thirteenth aspect is a method of controlling image display system (10) configured to be mounted in moving body (100), the method including: image (700) projection process of displaying image (700) by projecting image (700) to display object (101) of moving body (100); attitude angle (β) calculation process of calculating an attitude angle (β) of the moving body on a basis of time-series data of acceleration detection value (G) of an acceleration of moving body (100) in a predetermined period; and a display control process of controlling a position where image (700) is displayed and projected at display object (101) in accordance with the attitude angle (β) calculated by the attitude angle (β) calculation process. The attitude angle (β) calculation process excludes acceleration detection value (G) included in exclusion period (K1) in which an angular velocity detection value (Q1) of an angular velocity of moving body (100) is outside a predetermined range (S2), from the time-series data used for calculation of the attitude angle (β).

With this configuration, the accuracy of calculated attitude angle (β) can be improved. As a result, the display position of image (700) at display object (101) can be more precisely corrected.

A program according to a fourteenth aspect is configured to cause a computer system to execute the image display method according to the twelfth or thirteenth aspect. With this configuration, it is possible to provide a program configured to cause a computer system to execute the image display method.

Embodiment 3

Overall Configuration of Display Device

Figure 13:
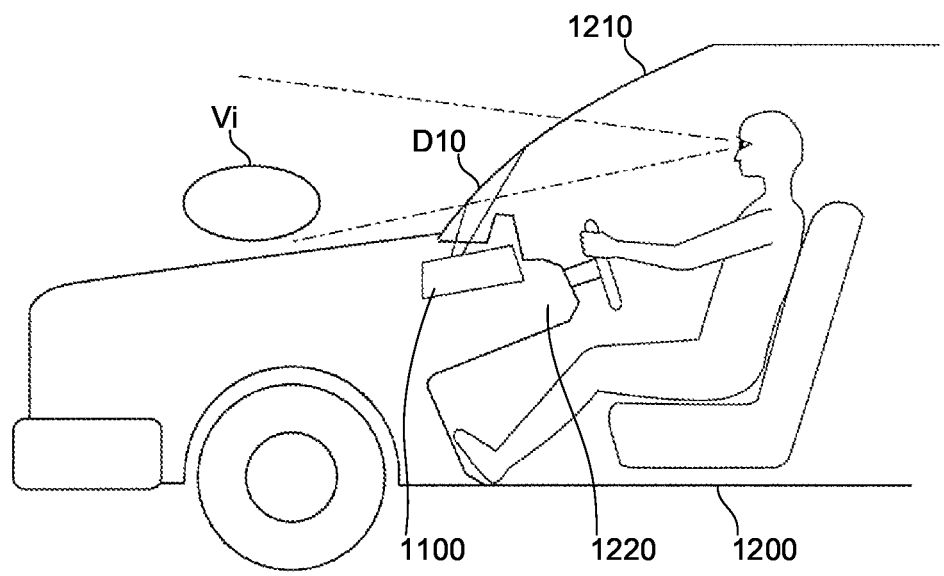
FIG. 13 is a vehicle including an HUD.

FIG. 13 illustrates automobile 1200 including display device 1100 as head-up display (HUD). Display device 1100 is attached near the top surface of dashboard 1220 of automobile 1200.

Display device 1100 projects light to region D10 within the driver's view indicated with the dashed line at front shield 1210. A part of the projected light is transmitted through front shield 1210, while another part of the light is reflected by front shield 1210. This reflected light travels toward the driver's eyes. The driver perceives the reflected light in his or her eyes as virtual image Vi, which looks like the image of an object on the other side of the front shield (outside automobile 1200) against the background of the real object seen through the front shield 1210.

Figure 14:
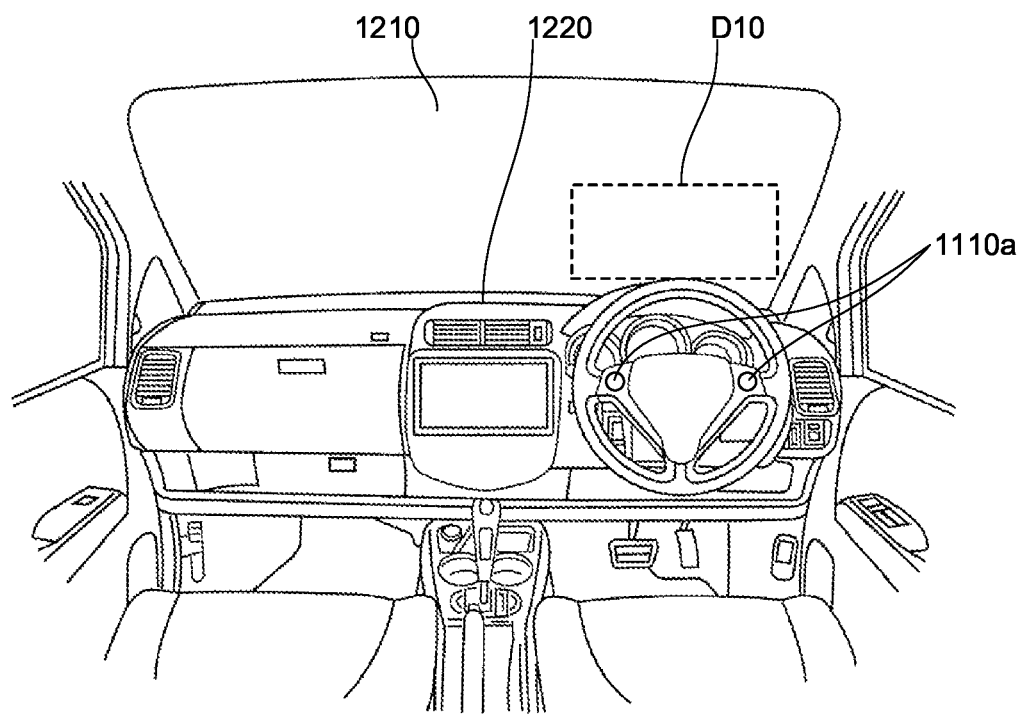
FIG. 14 illustrates an example of a region to which light is projected by a display device according to Embodiment 3.

FIG. 14 illustrates an example of region D10 as a region to which light is projected by display device 1100. As illustrated as the region surrounded by the broken line FIG. 14, region D10 is located on the lower side on the driver's seat side of front shield 1210. Display device 1100 attached to dashboard 1220 projects an image to front shield 1210 by projecting light to region D10 as illustrated in FIG. 13. In this manner, virtual image Vi that appears to be an image of an object located outside automobile 1200 as viewed from the driver is generated.

Note that an image projected to front shield 1210 may be perceived at a different distance from the driver in virtual image Vi depending on its vertical position in region D10. In the examples of FIG. 13 and FIG. 14 for example, since region D10 is located on the lower side than the driver's eye, the image on the lower side in region D10 is perceived at a position closer to the driver in virtual image Vi, and an object located at a position on a higher side in the image projected to region D10 is perceived as an object located father from the driver in virtual image Vi. The principle behind this perception is explained by a type of geometric perspective (vertical perspective).

Figure 15:
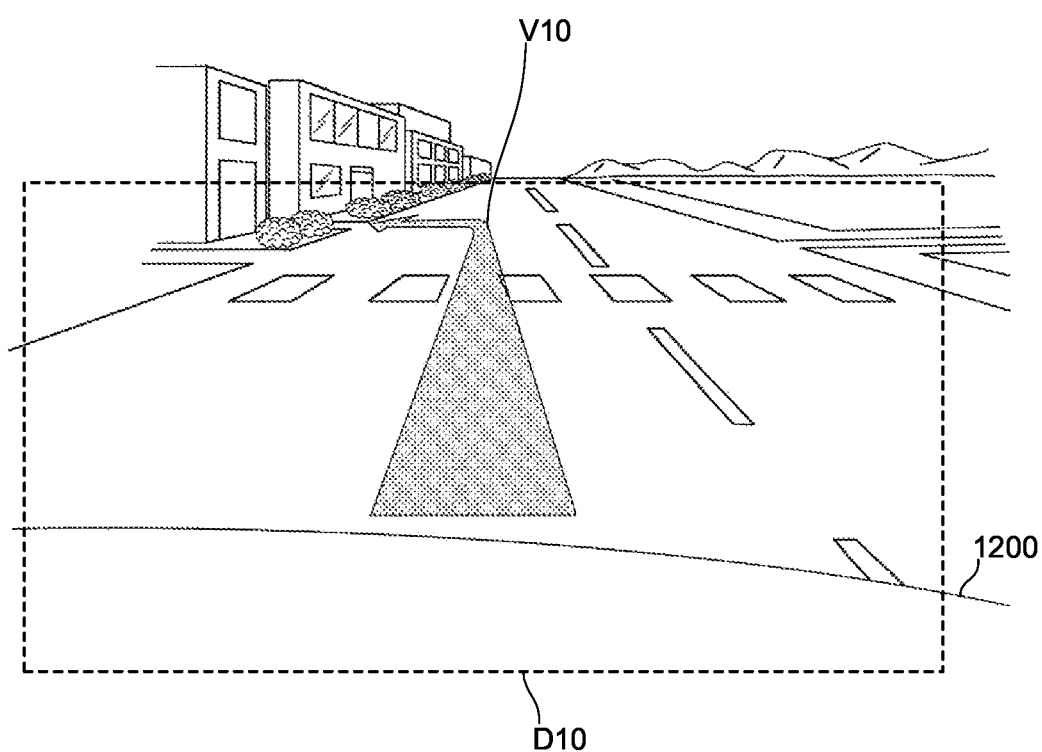
FIG. 15 illustrates an example of a display in which a virtual image is displayed in an overlapping manner on a front view.

FIG. 15 illustrates an example of a virtual image generated by display device 1100, and an example of superimposition of that virtual image and a front scenery of automobile 1200 as viewed from the driver of traveling automobile 1200.

In its entirety, FIG. 15 schematically illustrates a part of a scenery as viewed from the driver (not illustrated in the drawing) driving automobile 1200. It should be noted that the frame of the broken line indicating region D10 to which an image is projected from display device 1100 is illustrated for convenience of description of the present embodiment, and is not perceived as an entity by the driver. The reference numeral 1200 indicates a hood as a part of automobile 1200. In addition, the arrow image indicated with the reference numeral V10 is an AR (Augmented Reality) route that is an example of virtual image Vi generated by display device 1100 and perceived by the driver.

As illustrated in FIG. 15, AR route V10 as a virtual image is displayed in a superposed manner on the actual scenery in the driver's view. In practice, AR route V10 is displayed in a superimposed manner on the road. In this manner, the driver is guided to travel on the belt-shaped region indicated by AR route V10.

Virtual Image Display Position Adjustment Function

Figure 16:
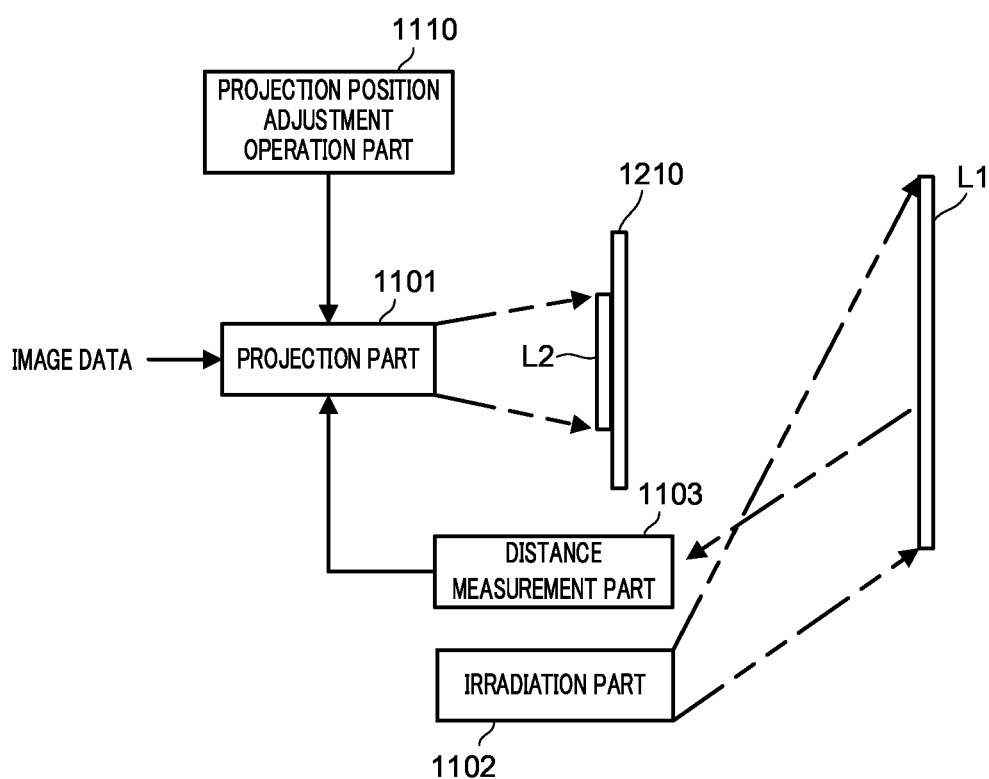
FIG. 16 illustrates a configuration of a main part of an embodiment for achieving a virtual image display position adjustment function.

FIG. 16 illustrates a configuration a main part for achieving a virtual image display position adjustment function provided in automobile 1200 of the present embodiment.

The automobile of the present embodiment includes projection part 1101, irradiation part 1102, distance measurement part 1103, and projection position adjustment operation part 1110.

With an input of image data such as an AR route, projection part 1101 displays a virtual image based on the image data at front shield 1210. To be more specific, projection part 1101 includes a light source part, a scanning part, an optical system and the like. Projection part 1101 of the present embodiment can project reference line L2 of a virtual image at front shield 1210.

Figure 17:
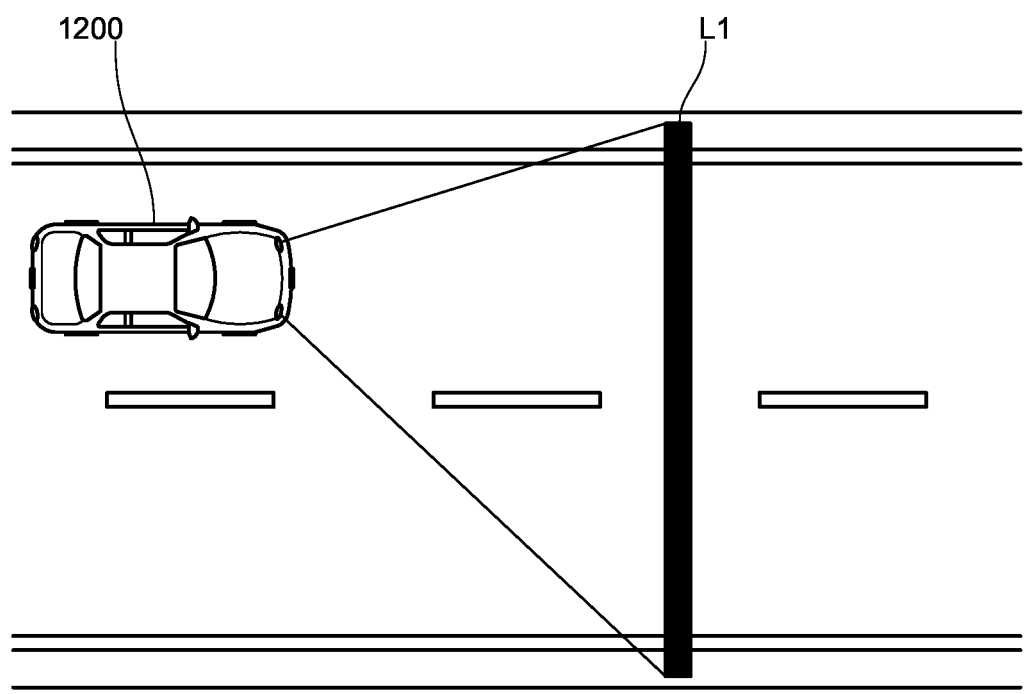
FIG. 17 illustrates a state of irradiation of a reference line of a real image by an irradiation part.

As illustrated in FIG. 17, irradiation part 1102 irradiates the road in front of the own vehicle over the width direction of the road with visible light serving as reference line L1 of the real image. In the present embodiment, irradiation part 1102 is implemented with a headlight having a projector function.

Distance measurement part 1103 measures the distance from the own vehicle to reference line L1. Distance measurement part 1103 is implemented with a visible light stereo camera or the like, for example. Note that distance measurement part 1103 is not limited to a visible light stereo camera, and may be various devices that can measure the distance to reference line L1. The information about the distance to reference line L1 obtained by distance measurement part 1103 is input to projection part 1101.

Projection part 1101 projects reference line L2 of the virtual image at a vertical position corresponding to the distance represented by the information about the distance to reference line L1 input from distance measurement part 1103. For example, in the case where the distance to reference line L1 measured by distance measurement part 1103 is 50 m, reference line L2 of the virtual image that appears to overlap reference line L1 of the real image at the position of 50 m is projected on front shield 1210.

On the basis of the amount of the operation by the user, projection position adjustment operation part 1110 adjusts the position in the vertical direction of the virtual image projected to front shield 1210 by projection part 1101. Projection position adjustment operation part 1110 is provided in a range where the driver's hands can reach even when the driver in a driving posture is viewing the real image and the virtual image from front shield 1210. In the present embodiment, projection position adjustment operation part 1110 is implemented with steering switch 1110a.

Figure 18:
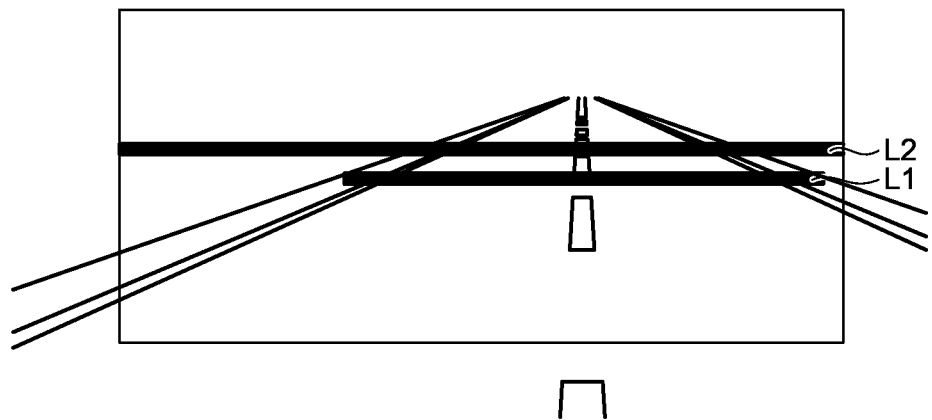
FIG. 18 illustrates a front view from a driver.

FIG. 18 illustrates a front view from a driver. From the driver, reference line L1 of the real image from irradiation part 1102 can be seen. In addition, from the driver, reference line L2 of the virtual image projected by projection part 1101 to front shield 1210 can be seen.

Reference line L2 is projected to a position corresponding to reference line L1, and therefore reference line L2 should appear to overlap reference line L1. However, when the attitude angle of automobile 1200 is changed from the basic attitude, reference line L2 does not appear to overlap with reference line L1. For example, when a passenger is in the rear seat, automobile 1200 is slightly tilted rearward. Then, reference line L2 of the virtual image moves upward in accordance with the rearward inclination of automobile 1200.

In the present embodiment, the deviation of virtual image in the vertical direction due to the variation of the attitude angle of automobile 1200 can be manually corrected using projection position adjustment operation part 1110.

Figure 19:
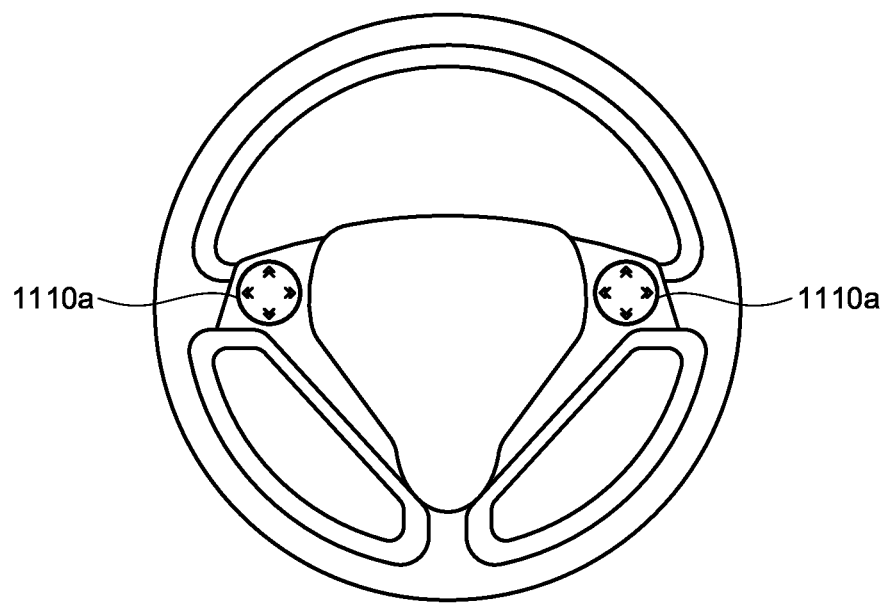
FIG. 19 illustrates a steering switch having a function as a projection position adjustment operation part.

FIG. 19 illustrates steering switch 1110a having functions as projection position adjustment operation part 1110. The left end of reference line L2 vertically moves in accordance with a vertical operation at left steering switch 1110a, and the right end of reference line L2 vertically moves in accordance with a vertical operation at right steering switch 1110a. In this manner, as illustrated in FIG. 18, in the case where reference line L2 is shifted in the upward direction than reference line L1, it suffices to operate left and right steering switches 1110a downward to move reference line L2 to a position overlapping reference line L1. In addition, since the movement amount of left and right ends of reference line L2 in the vertical direction can be independently adjusted by the amount of operation of left and right steering switches 1110a, adjustment can be performed such that reference line L2 overlaps reference line L1 even in the case where reference line L2 is not parallel to reference line L1 but is tilted and shifted with respect to reference line L1. That is, roll correction can be performed.

The above-described virtual image display position adjustment process is performed when a virtual image display position adjustment mode is set by the driver through an operation from an operation part (not illustrated) such as a predetermined operation button. For example, it is preferable that the driver set the virtual image display position adjustment mode at the start of driving to start the driving after the display position of the virtual image is adjusted. That is, since the attitude angle of the automobile changes in accordance with the seated position of the passenger, it is preferable to start the driving after the change in virtual image position due to the change in attitude angle is corrected with projection position adjustment operation part 1110.

In addition, an adjustment position of a virtual image may be stored as a calibration value. In this manner, for example, when a passenger is seated in the same position as the case where correction using projection position adjustment operation part 1110 has been made, the virtual image projection position can be corrected by reading the calibration value stored in projection part 1101. As a result, it is possible to reduce the number of manual adjustments with projection position adjustment operation part 1110.

As described above, according to Embodiment 3, with projection part 1101 that projects a virtual image on a display medium such as front shield 1210 and projects reference line L2 of the virtual image, distance measurement part 1103 that measures the distance to reference line L1 included in a real image, and projection position adjustment operation part 1110 that can adjust the projection position of the virtual image in the vertical direction at the display medium on the basis of the operation amount by the user, a deviation of a displayed virtual image due to a change in the attitude angle of automobile 1200 can be precisely corrected.

Modifications of Embodiment 3

Embodiment 3 is only an example embodiment for implementing the invention, and the technical scope of the invention should not be interpreted in a limited manner by these examples. In other words, the present invention can be implemented in various ways to the extent that it does not deviate from its gist or its main features.

Figure 20:
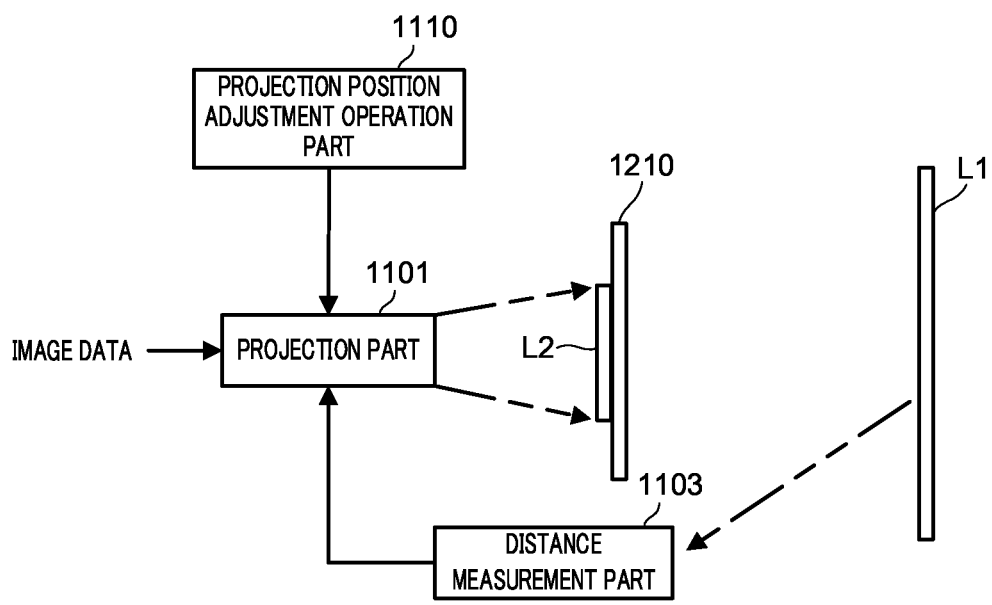
FIG. 20 illustrates an exemplary configuration of another embodiment.

While irradiation part 1102 is provided and reference line L1 of the real image is formed by irradiation part 1102 in Embodiment 3, the configuration of forming reference line L1 using irradiation part 1102 is not limitative. For example, a stop line on the road and the like may be reference line L1. In this case, irradiation part 1102 may be omitted as illustrated in FIG. 20. Note that "omit" does not mean that irradiation part 1102 is omitted from the automobile, but means that irradiation part 1102 is not used when adjusting the display position of the virtual image.

Note that while irradiation part 1102 and distance measurement part 1103 are separated from each other in FIG. 16 for convenience of illustration, a distance measurement part may be provided for the purpose of emitting light to a fixed distance in the case of a headlight having a projector function and the like. In this case, distance information may not be sent from distance measurement part 1103 to projection part 1101. The reason for this is that it suffices to preliminarily set such that reference line L1 is formed by irradiation part 1102 at a first distance (e.g., 50 m), and that projection part 1101 projects reference line L2 at a position corresponding to the first distance.

Conclusion

As described in Embodiment 3, vehicle (1200) according to an aspect of the present disclosure is vehicle (1200) in which a display device configured to display a virtual image in an overlapping manner on an outside real image as viewed from the user is mounted, and vehicle (1200) includes: projection part (1101) configured to project the virtual image and project reference line (L2) of the virtual image on display medium (1210); distance measurement part (1103) configured to measure the distance to reference line (L1) included in the real image; and projection position adjustment operation part (1110) configured to adjust the projection position of the virtual image in the vertical direction at the display medium (1210) on the basis of the operation amount of the user.

In addition, in vehicle (1200) according to an aspect of the present disclosure, the projection part (1101) projects reference line (L2) of the virtual image at a vertical position corresponding to the distance measured by the distance measurement part (1103).

In addition, in vehicle (1200) according to an aspect of the present disclosure, the projection position adjusted by the projection position adjustment operation part (1110) is stored as a calibration value.

In addition, vehicle (1200) according to an aspect of the present disclosure further includes irradiation part (1102) configured to emit visible light serving as reference line (L1) of the real image to a road in front of the own vehicle.

In addition, in vehicle (1200) according to an aspect of the present disclosure, the irradiation part (1102) is a headlight having a projector function.

This application is entitled to and claims the benefit of Japanese Patent Application No. 2019-059468 and Japanese Patent Application No. 2019-059194 filed on Mar. 26, 2019, the disclosure each of which including the specification, drawings and abstract is incorporated herein by reference in its entirety.

INDUSTRIAL APPLICABILITY

The present invention is useful as a technique of eliminating a deviation of a displayed virtual image in a display device that displays a virtual image in an overlapping manner on an outside real image as viewed from the user, as with a head-up display.

REFERENCE SIGNS LIST

10 Image display system
30 Image projection part
43 Attitude angle calculation section
51 Display control section
52 Acceleration sensor
100 Moving body
101 Display object
700 Image
1100 Display device
1101 Projection part
1102 Irradiation part
1103 Distance measurement part
1110 Projection position adjustment operation part
1110a Steering switch
1200 Vehicle
1210 Front shield
1220 Dashboard
Ax Front-rear axis
Az Vertical axis
Ay Horizontal axis
G Acceleration detection value
Gx, Gz Acceleration component
K1 Out-of-threshold range period
L1 Reference line of real image
L2 Reference line of virtual image
S1 Threshold value range
Q1 Angular velocity detection value
W1 Ratio
K3, K4 Additional period
β Attitude angle
Vi Virtual image

The invention claimed is:

1. An image display system that is mounted in a moving body, the image display system comprising:
    an image projector that displays an image by projecting the image to a display object of the moving body;
    an attitude angle calculation section that calculates an attitude angle of the moving body on a basis of time-series data of an acceleration detection value of an acceleration of the moving body in a predetermined period; and
    a display controller that controls a position where the image is displayed on the display object in accordance with the attitude angle calculated by the attitude angle calculation section,
    wherein the acceleration detection value includes components of two directions, and
    wherein the attitude angle calculation section excludes the acceleration detection value included in an exclusion period in which a ratio of the components of two directions is outside a predetermined range in the predetermined period, from the time-series data used for calculation of the attitude angle.

2. The image display system according to claim 1, wherein the attitude angle calculation section further excludes the acceleration detection value included in an exclusion period in which an angular velocity detection value of an angular velocity of the moving body is outside a predetermined range, from the time-series data used for calculation of the attitude angle.

3. The image display system according to claim 1, wherein the two directions include a vertical direction of the moving body and an orthogonal direction orthogonal to the vertical direction.

4. The image display system according to claim 3, wherein the orthogonal direction is a front-rear direction of the moving body.

5. The image display system according to claim 1, wherein the two directions are a vertical direction of the moving body, and a direction along an acceleration component obtained by combining an acceleration component in a front-rear direction of the moving body and an acceleration component in the horizontal direction of the moving body in the acceleration detection value in terms of vector.

6. The image display system according to claim 2, wherein the angular velocity is at least one of an angular velocity around a vertical axis of the moving body, an angular velocity around a front-rear axis of the moving body, and an angular velocity around a horizontal axis of the moving body.

7. The image display system according to claim 1, wherein the attitude angle calculation section excludes an acceleration detection value included in an additional period contiguous with the exclusion period, from the time-series data used for calculation of the attitude angle.

8. The image display system according to claim 7, wherein the additional period is provided at least at one of before and after the exclusion period.

9. The image display system according to claim 7, wherein the longer the exclusion period, the longer the additional period.

10. A moving body comprising:
the image display system according to claim 1; and
a moving body main body in which the image display system is mounted,
wherein the display object is a windshield of the moving body main body.

11. The image display system according to claim 1, wherein the ratio of the components of two directions is shifted more than a predetermined value from a value corresponding to the attitude angle of the moving body in the predetermined period.

12. An image display system that is mounted in a moving body, the image display system comprising:
an image projector that displays an image by projecting the image to a display object of the moving body;
an attitude angle calculation section that calculates an attitude angle of the moving body on a basis of time-series data of an acceleration detection value of an acceleration of the moving body in a predetermined period; and
a display controller that controls a position where the image is displayed on the display object in accordance with the attitude angle calculated by the attitude angle calculation section,
wherein the attitude angle calculation section excludes the acceleration detection value included in an exclusion period in which an angular velocity detection value of an angular velocity of the moving body is outside a predetermined range, from the time-series data used for calculation of the attitude angle.

13. The image display system according to claim 12, wherein the ratio of the components of two directions is shifted more than a predetermined value from a value corresponding to the attitude angle of the moving body in the predetermined period.

14. An image display method of controlling an image display system that is mounted in a moving body, the method comprising:
an image projection process of displaying an image by projecting the image to a display object of the moving body;
an attitude angle calculation process of calculating an attitude angle of the moving body on a basis of time-series data of an acceleration detection value of an acceleration of the moving body in a predetermined period; and
a display control process of controlling a position where the image is displayed on the display object in accordance with the attitude angle calculated by the attitude angle calculation process,
wherein the acceleration detection value includes components of two directions, and
wherein the attitude angle calculation process excludes the acceleration detection value included in an exclusion period in which a ratio of the components of two directions is outside a predetermined range in the predetermined period, from the time-series data used for calculation of the attitude angle.

15. The image display method according to claim 14, wherein the ratio of the components of two directions is shifted more than a predetermined value from a value corresponding to the attitude angle of the moving body in the predetermined period.

16. An image display method of controlling an image display system that is mounted in a moving body, the method comprising:
an image projection process of displaying an image by projecting the image to a display object of the moving body;
an attitude angle calculation process of calculating an attitude angle of the moving body on a basis of time-series data of an acceleration detection value of an acceleration of the moving body in a predetermined period; and
a display control process of controlling a position where the image is displayed on the display object in accordance with the attitude angle calculated by the attitude angle calculation process,
wherein the attitude angle calculation process excludes the acceleration detection value included in an exclusion period in which an angular velocity detection value of an angular velocity of the moving body is outside a predetermined range, from the time-series data used for calculation of the attitude angle.

17. The image display method according to claim 16, wherein the ratio of the components of two directions is shifted more than a predetermined value from a value corresponding to the attitude angle of the moving body in the predetermined period.

18. A computer-readable storage medium storing a program for causing a computer to execute a process, comprising:
an image projection process of displaying an image by projecting the image to a display object of a moving body;
an attitude angle calculation process of calculating an attitude angle of the moving body on a basis of time-series data of an acceleration detection value of an acceleration of the moving body in a predetermined period; and a display control process of controlling a position where the image is displayed on the display object in accordance with the attitude angle calculated by the attitude angle calculation process, wherein the acceleration detection value includes components of two directions, and wherein the attitude angle calculation process excludes the acceleration detection value included in an exclusion period in which a ratio of the components of two directions is outside a predetermined range in the predetermined period, from the time-series data used for calculation of the attitude angle.

19. The computer-readable storage medium according to claim 18, wherein the ratio of the components of two directions is shifted more than a predetermined value from a value corresponding to the attitude angle of the moving body in the predetermined period.

20. A computer-readable storage medium storing a program for causing a computer to execute a process, comprising:

an image projection process of displaying an image by projecting the image to a display object of a moving body;

an attitude angle calculation process of calculating an attitude angle of the moving body on a basis of time-series data of an acceleration detection value of an acceleration of the moving body in a predetermined period; and a display control process of controlling a position where the image is displayed on the display object in accordance with the attitude angle calculated by the attitude angle calculation process, wherein the attitude angle calculation process excludes the acceleration detection value included in an exclusion period in which an angular velocity detection value of an angular velocity of the moving body is outside a predetermined range, from the time-series data used for calculation of the attitude angle.

* * * * *